US007668966B2

(12) United States Patent
Klinker et al.

(10) Patent No.: US 7,668,966 B2
(45) Date of Patent: Feb. 23, 2010

(54) DATA NETWORK CONTROLLER

(75) Inventors: Eric Klinker, Oakland, CA (US);
Jeremy Johnson, Oakland, CA (US);
Steven McCanne, Berkeley, CA (US);
Daniel S. McKernan, Cupertino, CA (US); Gordon Chaffee, Fremont, CA (US); Charles J. Fraleigh, Sunnyvale, CA (US)

(73) Assignee: Internap Network Services Corporation, Atlanta, GA (US)

( * ) Notice: Subject to any disclaimer, the term of this patent is extended or adjusted under 35 U.S.C. 154(b) by 1240 days.

(21) Appl. No.: 10/286,576

(22) Filed: Nov. 1, 2002

(65) Prior Publication Data

US 2003/0088529 A1 May 8, 2003

Related U.S. Application Data

(60) Provisional application No. 60/350,186, filed on Nov. 2, 2001.

(51) Int. Cl.
*G06F 15/16* (2006.01)
(52) U.S. Cl. .................... 709/232; 709/230
(58) Field of Classification Search ............. 709/232
See application file for complete search history.

(56) References Cited

U.S. PATENT DOCUMENTS

| 5,598,532 | A | * | 1/1997 | Liron ................. 703/2 |
| 5,724,513 | A | | 3/1998 | Ben-Nun et al. |
| 5,781,534 | A | | 7/1998 | Perlman et al. |
| 5,870,561 | A | | 2/1999 | Jarvis et al. |
| 5,898,668 | A | | 4/1999 | Shaffer |
| 5,933,425 | A | | 8/1999 | Iwata |
| 5,953,312 | A | | 9/1999 | Crawley |
| 5,974,237 | A | * | 10/1999 | Shurmer et al. ....... 709/224 |

(Continued)

FOREIGN PATENT DOCUMENTS

EP  1017203 A2  7/2000

(Continued)

OTHER PUBLICATIONS

Labovitz et al., "Delayed Internet Routing Convergence", IEEE, Jun. 2001, pp. 293-306, vol. 9, No. 3.

(Continued)

*Primary Examiner*—John Follansbee
*Assistant Examiner*—Alan S Chou
(74) *Attorney, Agent, or Firm*—Kilpatrick Stockton LLP

(57) ABSTRACT

The present invention provides for a system and method for data network control. Using a flow control system, embodiments of the present invention can analyze traffic flow volume and performance, incorporate usage, billing, and cost control data to yield an improved data network controller. Efficiency in data routing is improved while costs are decreased by enabling the selection of the optimal performance data route. Cost constraints and costs are minimized for an overall data load. Given a diverse set of cost structures for available transit providers, the overall system cost can be minimized by distributing traffic in a manner that takes advantage of the diverse billing structures and yet maintains acceptable performance levels. Systems and methods in accordance with embodiments of the present invention determine projected flow performance and projected flow volume in relation to the available bandwidth and marginal cost to a destination provider.

12 Claims, 25 Drawing Sheets

U.S. PATENT DOCUMENTS

| | | | |
|---|---|---|---|
| 6,047,326 A | 4/2000 | Kilkki | |
| 6,047,331 A | 4/2000 | Medard et al. | |
| 6,055,571 A | 4/2000 | Fulp et al. | |
| 6,064,677 A | 5/2000 | Kappler et al. | |
| 6,078,957 A * | 6/2000 | Adelman et al. | 709/224 |
| 6,097,699 A | 8/2000 | Chen et al. | |
| 6,130,890 A | 10/2000 | Leinwand et al. | |
| 6,154,778 A | 11/2000 | Koistinen et al. | |
| 6,181,679 B1 | 1/2001 | Ashton et al. | |
| 6,185,635 B1 | 2/2001 | O'Loughlin et al. | |
| 6,226,751 B1 | 5/2001 | Arrow et al. | |
| 6,249,801 B1 | 6/2001 | Zisapel et al. | |
| 6,252,848 B1 | 6/2001 | Skirmont | |
| 6,256,314 B1 | 7/2001 | Rodrig et al. | |
| 6,262,976 B1 | 7/2001 | McNamara | |
| 6,275,470 B1 | 8/2001 | Ricciulli | |
| 6,292,464 B1 | 9/2001 | Elahmadi et al. | |
| 6,363,053 B1 * | 3/2002 | Schuster et al. | 370/230 |
| 6,363,056 B1 | 3/2002 | Beigi et al. | |
| 6,374,300 B2 | 4/2002 | Masters | |
| 6,393,486 B1 | 5/2002 | Pelavin et al. | |
| 6,400,681 B1 | 6/2002 | Bertin et al. | |
| 6,404,769 B1 | 6/2002 | Kapoor | |
| 6,405,219 B2 | 6/2002 | Saether et al. | |
| 6,466,984 B1 | 10/2002 | Naveh et al. | |
| 6,496,477 B1 | 12/2002 | Perkins et al. | |
| 6,549,781 B1 * | 4/2003 | O'Byrne et al. | 455/446 |
| 6,574,195 B2 | 6/2003 | Roberts | |
| 6,625,150 B1 * | 9/2003 | Yu | 370/389 |
| 6,658,457 B2 | 12/2003 | Nishikawa et al. | |
| 6,665,702 B1 | 12/2003 | Zisapel | |
| 6,678,248 B1 | 1/2004 | Haddock et al. | |
| 6,690,649 B1 | 2/2004 | Shimada | |
| 6,724,722 B1 * | 4/2004 | Wang et al. | 370/229 |
| 6,728,265 B1 | 4/2004 | Yavatkar et al. | |
| 6,738,349 B1 | 5/2004 | Cen | |
| 6,760,314 B1 | 7/2004 | Iwata | |
| 6,785,237 B1 | 8/2004 | Sufleta | |
| 6,801,502 B1 | 10/2004 | Rexford et al. | |
| 6,831,890 B1 | 12/2004 | Goldsack et al. | |
| 6,831,893 B1 | 12/2004 | Ben Nun et al. | |
| 6,842,783 B1 | 1/2005 | Boivie et al. | |
| 6,857,025 B1 | 2/2005 | Maruyama et al. | |
| 6,904,020 B1 | 6/2005 | Love et al. | |
| 6,947,379 B1 | 9/2005 | Gleichauf et al. | |
| 6,954,431 B2 | 10/2005 | Roberts | |
| 7,065,482 B2 | 6/2006 | Shorey et al. | |
| 7,133,365 B2 | 11/2006 | Klinker et al. | |
| 7,164,657 B2 * | 1/2007 | Phaal | 370/235 |
| 7,185,079 B1 * | 2/2007 | Bainbridge et al. | 709/223 |
| 7,222,190 B2 | 5/2007 | Klinker et al. | |
| 7,269,157 B2 | 9/2007 | Klinker et al. | |
| 2001/0021176 A1 | 9/2001 | Mimura et al. | |
| 2001/0037387 A1 | 11/2001 | Gilde et al. | |
| 2002/0010765 A1 | 1/2002 | Border | |
| 2002/0010792 A1 | 1/2002 | Border et al. | |
| 2002/0040400 A1 | 4/2002 | Masters | |
| 2002/0057699 A1 | 5/2002 | Roberts | |
| 2002/0075813 A1 | 6/2002 | Baldonado et al. | |
| 2002/0078223 A1 | 6/2002 | Baldonado et al. | |
| 2002/0103846 A1 | 8/2002 | Zisapel et al. | |
| 2002/0105909 A1 | 8/2002 | Flanagan et al. | |
| 2002/0105911 A1 | 8/2002 | Pruthi et al. | |
| 2002/0110084 A1 | 8/2002 | Butt et al. | |
| 2002/0141378 A1 | 10/2002 | Bays et al. | |
| 2002/0145981 A1 | 10/2002 | Klinker et al. | |
| 2002/0163884 A1 | 11/2002 | Peles et al. | |
| 2002/0184393 A1 | 12/2002 | Leddy et al. | |
| 2002/0186661 A1 | 12/2002 | Santiago et al. | |
| 2003/0002443 A1 | 1/2003 | Basso et al. | |
| 2003/0012145 A1 | 1/2003 | Bragg | |
| 2003/0016627 A1 | 1/2003 | MeLampy et al. | |
| 2003/0074449 A1 | 4/2003 | Smith et al. | |
| 2003/0076840 A1 | 4/2003 | Rajagopal et al. | |
| 2003/0079005 A1 | 4/2003 | Myers et al. | |
| 2003/0086422 A1 | 5/2003 | Klinker | |
| 2003/0088529 A1 | 5/2003 | Klinker et al. | |
| 2003/0088671 A1 | 5/2003 | Klinker | |
| 2003/0118029 A1 | 6/2003 | Maher et al. | |
| 2003/0133443 A1 | 7/2003 | Klinker et al. | |
| 2003/0214913 A1 | 11/2003 | Chao et al. | |
| 2004/0196787 A1 | 10/2004 | Wang et al. | |
| 2004/0258226 A1 | 12/2004 | Host | |
| 2007/0140128 A1 | 6/2007 | Klinker et al. | |

FOREIGN PATENT DOCUMENTS

| | | |
|---|---|---|
| EP | 1063818 A2 | 12/2000 |
| JP | 11027327 | 1/1999 |
| JP | 2001-024699 | 1/2001 |
| WO | WO-98/58474 | 12/1998 |
| WO | WO-99/27684 | 6/1999 |
| WO | WO-02/084951 | 10/2002 |
| WO | WO-03/040874 A2 | 5/2003 |
| WO | WO-03/040947 | 5/2003 |
| WO | WO-03/041342 | 5/2003 |
| WO | WO-2004/040423 A3 | 5/2004 |

OTHER PUBLICATIONS

International Search Report for PCT/US02/11357 mailed Aug. 19, 2002.
International Search Report for PCT/US02/35158 mailed Dec. 23, 2002.
International Search Report for PCT/US02/35488 mailed Feb. 13, 2003.
Written Opinion for PCT/US02/11357 mailed Apr. 16, 2003.
International Search Report for PCT/US02/35156 mailed May 30, 2003.
International Preliminary Examination Report for PCT/US02/11357 mailed Oct. 1, 2003.
International Search Report for PCT/US03/34446 mailed May 26, 2004.
Supplementary European Search Report from the European Patent Office for EP02719487 mailed Aug. 22, 2005.
Official Action of Japanese Patent Office for JP 2002-582558 mailed Dec. 19, 2006.
Official Action of Japanese Patent Office for JP 2002-582558 mailed Sep. 11, 2007.

* cited by examiner

DATA NETWORK CONTROLLER

CROSS-REFERENCES TO RELATED REFERENCES

This application is related to the below-referenced U.S. Provisional and Non-Provisional Patent Applications. The subject matter of the related applications is hereby incorporated by reference. The related applications are commonly assigned.

- U.S. Non-Provisional Patent Application entitled, "System and Method to Assure Network Service Levels with Intelligent Routing," having U.S. patent application Ser. No. 09/833,219 and filed Apr. 10, 2001, now U.S. Pat. No. 7,269,157;
- U.S. Non-Provisional Patent Application entitled, "System and Method to Provide Routing Control of Information Over Data Networks," having U.S. patent application Ser. No. 10/013,809 and filed Dec. 7, 2001, now U.S. Pat. No. 7,222,190;
- U.S. Non-Provisional Patent Application entitled, "System and Method to Provide Routing Control of Information Over Networks," having U.S. patent application Ser. No. 10/040,902 and filed Dec. 28, 2001, now U.S. Pat. No. 7,133,365; and
- U.S. Provisional Patent Application entitled, "System and Method to Assure Network Service Levels and Bandwidth Management with Intelligent Routing," having U.S. Provisional Patent Application No. 60/350,186 and filed Nov. 2, 2001. This application also claims priority to U.S. Provisional Patent Application No. 60/350,186.

BACKGROUND

The present invention relates generally to the control of data over network communications systems, and more specifically to a data network controller.

Data networks are communications systems that connect nodes for the purpose of sharing computing resources. Creating efficient data routes between source and destination nodes is an important goal of organizations using data networks to facilitate the sharing of resources, data, and information.

A node is typically represented by one or more computing devices, which can include personal computers and peripheral equipment. Interchangeably referred to herein as a "point," a node is typically an endpoint for a particular segment on a data network known as either a "route" or "path." The segment defined between two consecutive nodes is hereinafter referred to as a "hop." Additionally, an autonomous system ("AS") hop refers to a segment within, for example, a single autonomous system. Further, a hop can also be a portion of a network path that is defined by two non-consecutive nodes.

For example, 15 individual nodes may exist between a source and a destination. These 15 nodes may span three autonomous systems, thus a total of 7 hops might be defined. The first hop could run from an egress node of the source network to an ingress node of the first AS. The second hop could run across the first AS between its egress and ingress nodes. The third hop could run from the egress node of the first AS to an ingress node of an second AS. The fourth hop could run from an ingress node to an egress node of the second AS. The fifth hop could run across an egress node of the second AS to an ingress node of the third AS. The sixth hop could run between an ingress node and an egress node of the third AS. Finally, the seventh hop could run between an egress node of the third AS to the destination node. Although the above example listed seven hops, a data path such as that described above, may be composed of fewer or greater than the number of hops described. Moreover, more than one hop could run between the ingress and egress nodes of an AS.

A source and/or a destination may embody a data source, such as a web-based database, storage enclosure, series of storage facilities, or the like that maintains computational resources for a particular organization. Resources may include mission-critical data or software programs, or applications, which are used to execute specific missions. For example, in a banking context, a database may contain sensitive and secure financial information for clients or partners. This information is often required to support mission-critical applications. In many situations where large distributed organizations depend upon the sharing of such resources, data networks are implemented and often through the use of more than one network service provider or "NSP." Where more than one NSP is used for a network, the network is said to be "multi-homed." Where a multi-homed network exists, there are several drawbacks to conventional data network control.

First, efficiency of routing data is a significant problem with regard to conventional data network control systems. Generally, efficiency includes optimizing network performance and minimizing costs. Reducing costs and maximizing performance (e.g., reducing loss, latency, jitter, etc.) are common goals among conventional data routing control techniques and technologies. However, conventional data network control systems are unable to achieve maximum performance at minimum cost for most destinations. Efficiency is often sacrificed when considered against the cost of data transmission and performance of a data network. In other words, cost and performance are factors which often, either implicitly or explicitly, override efficiency. Although efficiency is often critical, it is difficult to achieve because there are numerous factors influencing the logic and decision-making processes in terms of how, when, and where to route data between a source and a destination. Multi-homed networks have inherent barriers to achieving efficient data routing due to the use of multiple NSPs. Thus, multi-homing requires the evaluation of too many routes for determining candidate data paths with conventional route control techniques.

Protocols such as Border Gateway Protocol ("BGP") is a data protocol used to standard data communications between ASes. For multi-homed enterprises or organizations, BGP is a useful protocol. However, in terms of efficiency, BGP may not necessarily provide the optimum solution. BGP does not make routing control decisions based upon either cost information or performance statistics. Instead, BGP makes decisions on AS paths and other administrative settings. And even though BGP distributes data load on NSPs, it does not distribute data loads to minimize bandwidth usage costs.

Further, BGP routes data to a destination in only one way such that performance is not considered in routing control decisions by traditional use of BGP. Although a better performing route may exist, BGP will not shift data traffic to the better performing route. In another example, an optimum performing route may exist, but the route may later degrade. Since BGP is unable to account for the subsequent degradation, if cannot adjust to a better performing route to resolve such degradation. As an example, a shorter, lower performance route and a longer, higher performance route might both exist to the same destination. BGP will make routing control decisions to direct data traffic flow over the shorter route. Although the longer route is the better performing route, BGP and conventional protocols will select the shorter route, despite the lower-performance quality of the selected route. Therefore, there is a need for a solution to control data routing while maximizing performance and minimizing costs for most destinations.

Another drawback to conventional data network controllers is usage overruns. NSPs can set usage thresholds by generally measuring flow volumes or bandwidth. These thresholds define maximum utilization rates and, for example, are often user-configurable. When maximum utilizations rates are met, any excess data flow spills over into another, generally more expensive NSP usage profile such that the excess data flows cost more to route. Inflexible provider pricing tiers result in incrementally more expensive buckets in which overflow data is placed. Rather than re-allocate bandwidth needs in a more efficient manner, conventional data route control techniques often shift maximum and/or minimum pricing limits, resulting in dynamic and static pricing models. Ultimately, the multi-homed enterprise or organization is not maximizing the efficiency of its data routing requirements and, thus, pay additional costs unnecessarily. In large distributed networks, these costs may result in significant financial payments far beyond what is required given the amount of data that needs to be routed to support any mission-critical applications. For example, a significant part of these costs is the time-instantaneous cost of using a given NSP.

Further, many traditional route control products and methods today utilize and make control decisions on routes as advertised in a protocol routing table, such as a Border Gateway Protocol (BGP) routing table. These routes are often large allocations of address space meant to keep the inter-provider routing table small. Unfortunately, these route control products do not take into consideration the vast geographic distances between adjacent networks of a large address project. Geography can affect the performance of routing data because one or more paths can degrade due to, for example, congestion caused by network outages, line cuts, etc. Therefore, a controller decision intended to correct a routing problem in a network, especially in a multi-homed situation, could have far-reaching and adverse effects upon numerous addresses, depending upon the number of addresses affected.

Therefore, what is needed is a system and method for overcoming the aforementioned drawbacks of conventional route controllers and route control techniques.

SUMMARY OF THE INVENTION

The present invention is directed to a data network controller. The data network controller comprises a control module for controlling a network. The data network controller also analyzes aggregate flow information via an interface for communicating aggregate flow information to other modules. Information received by a cache is shared with data network controller and elements of a flow control system. An active calibrator communicates network data to the data network controller and an aggregation module is used for aggregating flow information. A bus, such as a software bus, is used for inter-module communication. A user module provides user information, which is communicating to the control module. A file library stores data for provider information and communicates the information to the control module. Additional information such as traffic and policy information is stored in a repository which can provide request information to the data network controller.

The present invention is directed to a data network controller. The data network controller comprises a control module for controlling a data network. The data network controller also analyzes aggregate flow information via an interface for communicating aggregate flow information to other modules. Information received by a cache is shared with data network controller and elements of a flow control system. An active calibrator communicates network data to the data network controller and an aggregation module is used for aggregating flow information. A bus, such as a software bus, is used for inter-module communication. A user module provides user information, which is communicating to the control module. A file library stores data for provider information and communicates the information to the control module. Additional information such as traffic and policy information is stored in a repository which can provide request information to the data network controller.

Another embodiment of the present invention discloses a method for controlling a network. The method comprises evaluating a candidate latency, evaluating a candidate loss, comparing a candidate bandwidth to a bandwidth allocation, determining a loss value, determining a cost, evaluating an identifier, and determining a change value.

The method further comprises determining a lowest latency if the candidate bandwidth is less than the bandwidth allocation, determining a lowest loss, determining a greatest available bandwidth based on a cost and a usage variable, determining a cost tier, determining a lowest identifier, and assigning a change value.

In another embodiment of the present invention a method for controlling a network is disclosed. The method comprises comparing a candidate loss to a current loss, comparing a candidate latency to a current latency, determining a best latency, determining a best loss, evaluating a candidate bandwidth value, determining a maximum candidate bandwidth value, determining a cost tier, determining a lowest identifier, and assigning a change value.

Other embodiments of the present invention disclose an apparatus for controlling a network. The apparatus comprises a means for evaluating a candidate latency, a means for evaluating a candidate loss, a means for comparing a candidate bandwidth to a bandwidth allocation, a means for determining a loss value, a means for determining a cost, a means for evaluating an identifier, and a means for determining a change value.

The apparatus further discloses a means for determining a lowest latency if the candidate bandwidth is less than the bandwidth allocation, a means for determining a lowest loss, a means for determining a greatest available bandwidth based on a cost and a usage variable, a means for determining a cost tier, a means for determining a lowest identifier, and a means for assigning a change value.

Another embodiment of the present invention discloses an apparatus for controlling a network where the apparatus comprises a means for comparing a candidate loss to a current loss, a means for comparing a candidate latency to a current latency, a means for determining a best latency, a means for determining a best loss, a means for evaluating a candidate bandwidth values, a means for determining a maximum candidate bandwidth value, a means for determining a cost tier, a means for determining a lowest identifier, and a means for assigning a change value.

Still another embodiment of the present invention provides for a computer-readable medium storing instructions for controlling a network, by performing the steps of evaluating a candidate latency, evaluating a candidate loss, comparing a candidate bandwidth to a bandwidth allocation, determining a loss value, determining a cost, evaluating an identifier, and determining a change value.

The computer-readable medium further comprises the steps of determining a lowest latency if the candidate bandwidth is less than the bandwidth allocation, determining a lowest loss, determining a greatest available bandwidth based on a cost and a usage variable, determining a cost tier, determining a lowest identifier, and assigning a change value.

In another embodiment of the present invention, a computer-readable medium storing instructions for controlling a network is disclosed. The computer readable medium performs the steps of comparing a candidate loss to a current loss, comparing a candidate latency to a current latency, determining a best latency, determining a best loss, evaluating a candidate bandwidth values, determining a maximum candidate bandwidth value, determining a cost tier, determining a lowest identifier, and assigning a change value.

Another embodiment of the present invention discloses a computer data signal embodied in a carrier wave. The computer data signal comprises program code for evaluating a candidate latency, program code for evaluating a candidate loss, program code for comparing a candidate bandwidth to a bandwidth allocation, program code for determining a loss value, program code for determining cost, program code for evaluating an identifier, and program code for determining a change value.

The computer data signal embodied in a carrier wave further comprises program code for determining a lowest latency if the candidate bandwidth is less than the bandwidth allocation, program code for determining a lowest loss, program code for determining a greatest available bandwidth based on a cost and a usage variable, program code for determining a cost tier, program code for determining a lowest identifier and program code for assigning a change value.

Another embodiment of the present invention discloses a computer data signal embodied in a carrier wave comprising program code for comparing a candidate loss to a current loss, program code for comparing a candidate latency to a current latency, program code for determining a best latency, program code for determining a best loss, program code for evaluating candidate bandwidth values, program code for determining a maximum candidate bandwidth value, program code for determining a cost tier, program code for determining a lowest identifier, and program code for assigning a change value.

DETAILED DESCRIPTION OF THE SPECIFIC EMBODIMENTS

Figure 1A:
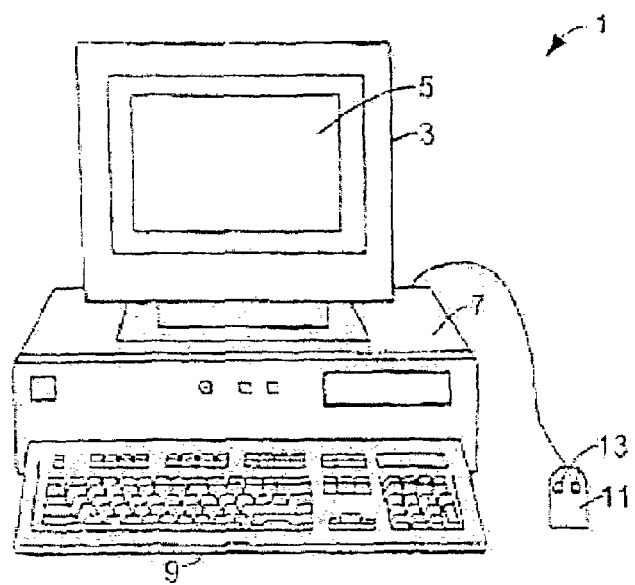
FIG. 1A is an exemplary computer system for presenting to a user a user interface suitable to practice an embodiment of the present invention.

Detailed descriptions of specific embodiments of the present invention are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process or manner. Although numerous embodiments are discussed herein, the present invention is not limited to those embodiments. In many instances, for example, routing control protocols such as BGP, may be foreseeably replaced or superseded by other types of protocols for either addressing or routing. The detailed descriptions presented herein are provided to enable one skilled in the art to implement the present invention.

The present invention relates generally to routing of data over networked communication systems, and more specifically to a system and method for route control over data networks. Data transmission in a network uses protocols to standardize sharing of resources between communications devices. BGP is a protocol used between autonomous networks, particularly multi-homed networks or networks that rely upon more than one service provider to access the Internet. In many instances, data routing relies upon the use of protocols such as BGP, which can also be classified as internal and external, depending upon how BGP information is distributed among external routers. Other examples of protocols include Exterior Gateway Protocol, and Inter-Domain Routing Protocol, Stream Transmission Control Protocol (SCTP), and Transmission Control Protocol/Internet Protocol (TCP/IP) all of which standardize communication among or over data networks. Embodiments of the present invention improves efficiency in data routing control, enabling best routing control performance at the lowest network cost for all destinations. As discussed above, conventional data routing control techniques are unable to improve efficiency and minimize costs for destinations. Embodiments of the present invention leverage diverse paths and diverse billing structures and contracts to maximize efficiency. Conventional solutions can only minimize cost for some destinations, and performance for others. Performance metrics such as RTT, packet loss, and jitter can be optimized for all destinations, in accordance with embodiments of the present invention. Maximizing performance and minimizing costs in the present invention generally involve selecting the best candidate data path relative to the cost and performance of the selected path.

A data path as described herein can be a route between a first point (e.g., a source node) to a second point (e.g., a destination node), and is divided into segments or "hops," each of which connects two consecutive nodes along a data path between a source and a destination point. Hops can also be defined as segments spanning a single autonomous system ("AS") or connecting two or more AS. To identify a particular node in a network, typically IP or other protocol-bound addresses. A typical IP address is composed of 32-bits, composing 4 individual address sets of 8 bits each. The netmask or prefix refers to the number of relevant bits in an address. For example, an IP address of 239.051.0.0/16, in a classless inter-domain routing (CIDR) schema, identifies the relevant address of a particular node. The /16 prefix identifies a netmask of 16 bits where the first 16 bits of the address are relevant for announcing or advertising this address, in accordance with one embodiment of the present invention.

Conventional data control techniques generally employ probing in order to define the network topology and assert control over data routing. In accordance with an embodiment of the present invention, data control uses prefix lengths that exist in an Internet routing table, typically identified using length designations such as "/16." The longer the prefix, the more specific the address. A /16 prefix represents a larger subset of addresses than a /24 prefix. If a problem occurs with a point addressed with a /16 prefix, for example, a larger number of addresses would be affected than a point with a prefix of /24. Thus, a /16 prefix would affect more destinations or addresses than a /24 prefix. Conventional techniques assign arbitrary-length prefixes to route announcements. By creating topological network maps, the present invention as described below can provide, in accordance with one embodiment, for data routing control to occur with greater emphasis on efficiency and, incidentally, using fewer announcements with greater specificity. Thus, data traffic volume is reduced and the efficiency of data routing and control is improved.

Although the term "prefix" is used herein to describe the subdivision of IP addresses, it is noteworthy that the embodiments are not limited to the use of a prefix. Rather, any suitable "address set" can be substituted for "prefix," "sub-prefix," etc. to describe how an address of interest (i.e., destination) can be categorized. The addresses need not be contiguous in a prefix boundary and can be as small as a single active address (i.e., "/32"). Path tracing probes are sent to obtain candidate path measurements to network points up to, and sometimes including the destination, or to any network point that cannot be probed, due to disabling measures such as firewalls or filters. Identifiable convergence points, or points where more than one data route converge, are actively probed and announced for data routing. The following figures and discussion further illuminate embodiments of the present invention.

Figure 1B:
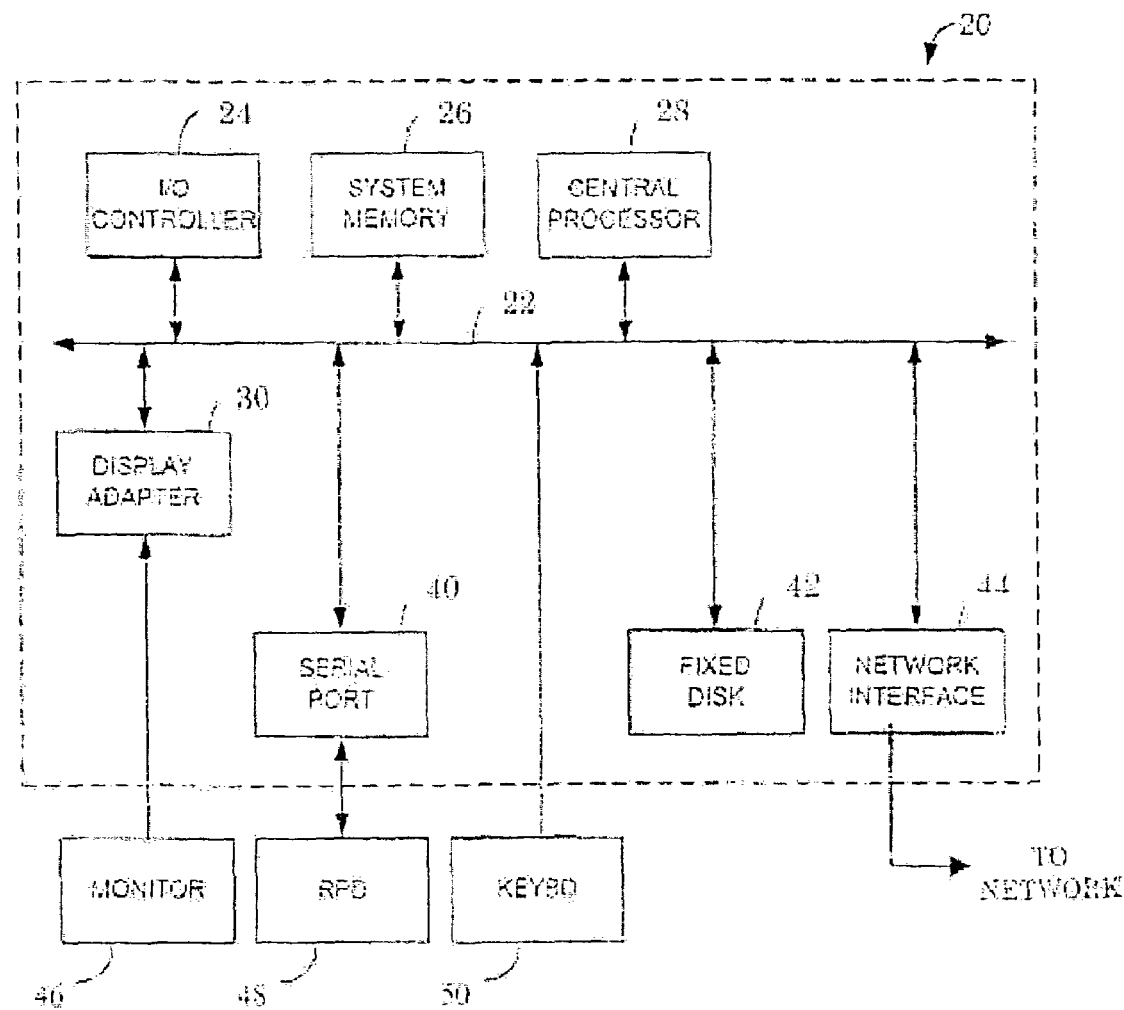
FIG. 1B shows basic subsystems in the computer system of FIG. 1A.
Figure 1C:
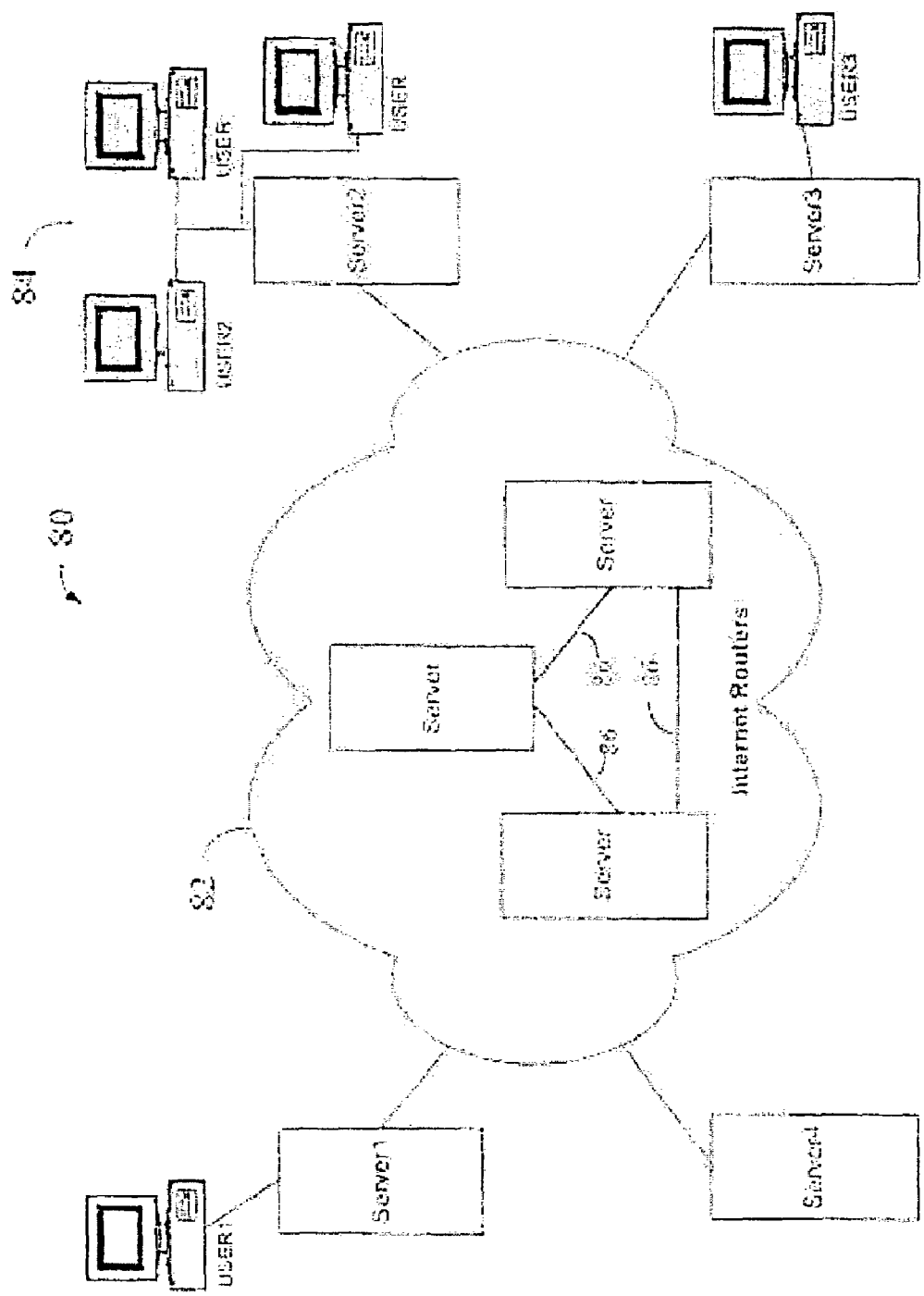
FIG. 1C is a generalized diagram of one exemplary computer network suitable for use with the present invention.

FIGS. 1A, 1B, and 1C illustrate basic hardware components suitable for practicing a specific embodiment of the present invention. FIG. 1A is an illustration of an exemplary computer system 1 including display 3 having display screen 5. Cabinet 7 houses standard computer components such as a disk drive, CD-ROM drive, display adapter, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, voice or visual recognition, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

FIG. 1B illustrates subsystems that might typically be found in a computer such as computer 1. In FIG. 1B, subsystems within box 20 are directly interfaced to internal bus 22. Such subsystems typically are contained within the computer system such as within cabinet 7 of FIG. 1A. Subsystems include input/output (I/O) controller 24, System Memory (or random access memory "RAM") 26, central processing unit CPU 28, Display Adapter 30, Serial Port 40, Fixed Disk 42, Network Interface Adapter 44 (e.g., Network Interface Card, or NIC), which in turn is configured to communicate with a network, such as by electrical, radio, or optical means known in the art. The use of bus 22 allows each of the subsystems to transfer data among subsystems and, most importantly, with the CPU, where the CPU might be a Sparc™, an Intel CPU, a PowerPC™, or the equivalent. External devices can communicate with the CPU or other subsystems via bus 22 by interfacing with a subsystem on the bus. Thus, Monitor 46 connects with Display Adapter 30, a relative pointing device (e.g. a mouse) connects through a port, such as Serial Port 40. Some devices such as Keyboard 50 can communicate with the CPU by direct means without using the main data bus as, for example, via an interrupt controller and associated registers.

As with the external physical configuration shown in FIG. 1A, many subsystem configurations are possible. FIG. 1B is illustrative of but one suitable configuration. Subsystems, components or devices other than those shown in FIG. 1B can be added. A suitable computer system also can be achieved using fewer than all of the sub-systems shown in FIG. 1B. For example, a standalone computer need not be coupled to a network so Network Interface 44 would not be required. Other subsystems such as a CD-ROM drive, graphics accelerator, etc. can be included in the configuration without affecting the performance of the system of the present invention.

FIG. 1C is a generalized diagram of a typical network that might be used to practice an embodiment of the present invention. In FIG. 1C, network system 80 includes several local networks coupled to computer data network 82, such as the Internet, WAN (Wide Area Network), or similar networks. Network systems as described herein refer to one or more local networks and network service providers that make up one or more paths from a source to a destination and vice versa. Network systems, however, should be understood to also denote data networks that include one or more computing devices in communication using any networking technology. Although specific network protocols, physical layers, topologies, and other network properties are presented herein, the present invention is suitable for use with any multi-path network relying upon more than one Internet/network service provider (e.g., a multi-homed network interconnected to other networks), especially those networks that employ Internet Protocol (IP) for routing data, such as flows having one or more packets of information according to the protocol. Furthermore, although a specific implementation is not shown in FIG. 1C, one having ordinary skill in the art should appreciate that a data flow control system according to the present invention can be deployed within one or more data networks 82 or configured to operate with network system 80.

In FIG. 1C, computer USER1 is connected to Server1, wherein the connection can be by any network protocol, such as Ethernet, Asynchronous Transfer Mode, IEEE standard 1553 bus, modem connection, Universal Serial Bus, etc. The communication link need not be a wire but can be infrared, radio wave transmission, etc. As depicted, Server1 is coupled to the data network 82, such as the Internet or, for example, any other data network that uses protocols such as Transmission Control Protocol/Internet Protocol for data communication. The data network is shown symbolically as a collection of server routers 82.

The exemplary use of the Internet or another data network for distribution or communication of information is not strictly necessary to practice the present invention but rather is merely used to illustrate a specific embodiment. Further, the use of server computers and the designation of server and client machines are not crucial to an implementation of the present invention. USER1 Computer can be connected directly to the Internet. Server1's connection to the Internet is typically by a relatively high bandwidth transmission medium such as a T1 line, a T3 line, Metro Area Ethernet, or the like, although it might be connected in a similar fashion as with USER1. Similarly, other computers 84 are shown utilizing a local network (e.g., Local Area Network, or LAN) at a different location from USER1 Computer. The computers at 84 are coupled via Server2 to the Internet. Although computers 84 are shown to include only a single server (e.g., Server2), two or more servers can be connected to the local network associated with computers 84. The USER3 and Server3 configuration represent yet a third network of computing devices.

Figure 2:
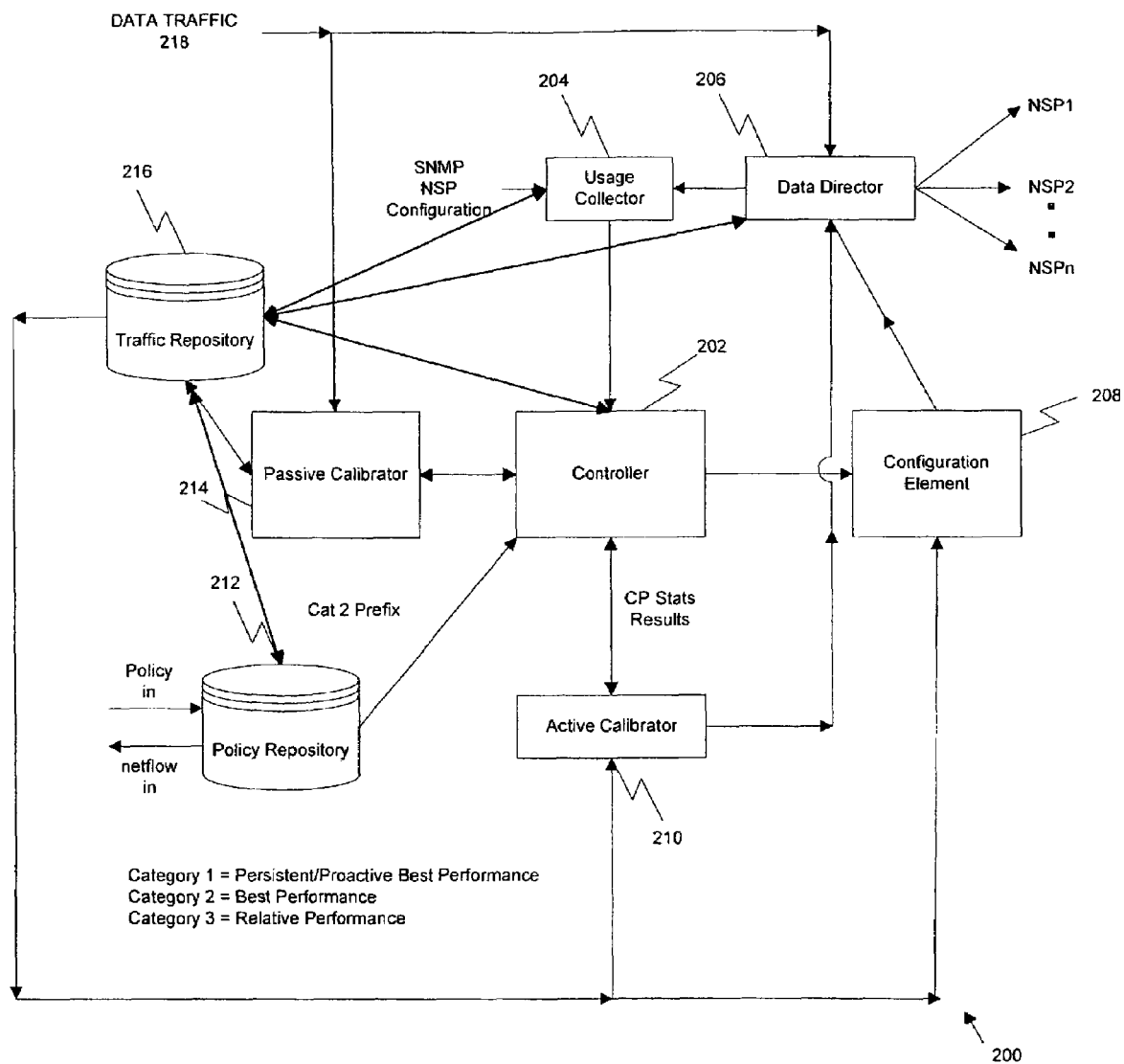
FIG. 2 is a simplified block diagram of one embodiment of a controller according to one embodiment of the present invention.

FIG. 2 illustrates an exemplary flow control system in accordance with a specific embodiment of the present invention. Flow control system 200 is configured to communicate with one or more network elements of the data network. Flow control system 200 houses a controller 202 which communicates with various applications. These applications include usage collector 204, data director 206 (shown communicating with multiple NSPs, as might occur in a multi-homed enterprise), configuration element 208, active calibrator 210, a policy repository 212, passive calibrator 214 which is communicating with a traffic repository 216. An exemplary data flow 218 is shown entering flow control system, providing direct input to data director 206 which directs the data traffic to NSPs, based on control signals received from controller 202 via configuration element 208. Data traffic is also monitored by passive calibrator 214 which stores representative data in traffic repository 216. Examples of data stored in traffic repository may include performance parameters such as latency, available and allocable bandwidth measurements.

Although flow control system 200 is shown external of and in communication with source network 82 elements such as configuration element 208, flow control system 200 can be wholly embodied in any of the elements shown, or alternatively, can be distributed, in portions, over each of the elements such as servers 86. In another embodiment, flow control system 200 resides on one or more servers or network elements within exemplary source network 82.

An exemplary data network includes one or more source networks 82. A source network 82 typically is a local network including one or more servers owned and operated by web services providers, application/internet/network service providers, managed service providers, content delivery networks, web hosting companies, individual enterprises, corporations, entities and the like. Such service providers typically communicate information to users that are further removed from the multi-homed network service providers 82, such as NSP 1, NSP 2, NSP 3, ... and NSPn, as illustrated in FIG. 2. In one example, NSPs are coupled to a source network or source point as to be considered a first set of data networks. These NSPs, or first set of data networks, are in turn coupled to a second set of networks, wherein the second set is connected to multiple other networks, thus establishing one or more paths from a source to a destination.

In an embodiment of flow control system 200 operates to measure end-to-end (i.e., source to destination and destination to source) data traffic 218 in terms of flow characteristics, such as performance, cost, bandwidth, and the like. Flow control system 200 also generates statistics associated with data paths across multiple NSPs in real time, or near-real time. Such statistics are communicated to source network 82 for providing network engineering and administration personnel, for example, with report information such that on-the-fly reports can be created to provide information related to route-change activity, traffic performance as delivered to selected destinations and transit provider usage (i.e., bandwidth), cost, and the like.

In one embodiment of the present invention, a local computing device uses information extracted from policy repository 212 and traffic repository 216, requested by controller 202. Accessing flow control system 200 and controller 202 using, for example, a graphical user interface ("GUI"), users can monitor, modify, delete, and enter user-configurable information at usage collector 204. Graphical representations that may be indicative of data traffic along one or more routes (e.g., paths between a source and a destination) can also be presented to users via a GUI. Network or systems administration personnel, or any entity responsible with flow control, with access to source network 82 can provide control information to flow control system 200 via usage collector 204 to modify system operation by, for example, changing data traffic flow from an under-performing route to a route which is more efficient route. Intervention by network administration personnel, however, is not necessary for flow control system 200 to operate in accordance with the present invention.

Flow control system 200 also compares specific data traffic flows (i.e., both uni- and bi-directional traffic flows outbound from and inbound into the data network) to determine whether a particular traffic flow meets one or more rules of an associated flow policy. A flow policy, as referred to herein and stored in policy repository 212 includes a set of one or more rules that is associated with a particular data traffic flow related to particular system user (e.g., as denoted by IP address prefix). Specified rules set by either default or user-configured are also stored in policy repository for providing parameters on the performance and operation of flow control system 200. Criteria for performance are used to guide the operation of flow control system 200.

Minimum criteria represent the lower levels of a range of values that defines acceptable routing behavior associated with a particular traffic flow characteristic. For example, a rule can set: the maximum acceptable cost, with or without regard to network service provider cost; the maximum load or bandwidth usage associated with traffic flows through specific providers; a range of acceptable (or non-acceptable) service providers; the maximum acceptable latency or loss over one or more paths across multiple network service providers; acceptable ranges of performance for each network service provider, such as maximum burst limits, minimum performance commitments and range of costs (i.e., cost structures with regards to time of day, type of traffic, etc.); and any other data flow characteristic that can influence the measurement or the control of data traffic.

Flow control system 200 further operates to detect when one or more rules, or flow policies, are violated and then to take remedial action. That is, flow control system 200 enforces policies associated with data traffic flow by correcting detrimental deviations in performance (i.e., service level assurance), costs or bandwidth (i.e., load in terms of percent capacity available per path). Flow control system 200 makes such corrections based on real- or near-real time traffic analysis, local path diversity (i.e., modifying one or more egress paths from a data network), and visibility into downstream available paths. For example, for a destination related to a specific traffic flow, flow control system 200 directs, or re-directs, traffic to one or more alternative paths to resolve a particular flow's deviation in terms of flow characteristics, from its flow policy.

In another embodiment, flow control system 200 can be a reactive flow control system. That is, a reactive flow control system is designed to react to policy violations indicating sub-standard routing of data traffic over one or more data networks or service providers (i.e., addresses pass-fail criteria) rather than optimizing performance at some targeted level of acceptable operation.

Referring back to FIG. 2, exemplary passive calibrator 214, active calibrator 210 and usage collector 204 are coupled to controller 202 to, in part, provide flow characteristics of data traffic. Controller 202 receives monitored flow characteristics as well as flow policies to be enforced. User or machine-generated rules pertaining to the flow policies relating to route control can be entered at controller 202. Specific parameters or operating guidelines for the present invention can be entered at controller 202 to ensure flow control system 200 maintains an appropriate level of operation, monitoring, and alarm status. Controller 202 is configured to determine if a flow policy is violated, and upon detection of such a violation, then to select a remedial action to resolve the violation. Data director 206 implements the corrective action to resolve an actual or pending violation, for example, by changing the traffic flow from the current path to a better performing path, pursuant to control signals generated by controller 202 and forwarded by configuration element 208.

Apart from managing traffic flow, flow control system also uses data stored in traffic repository 216 and policy repository 212. Both traffic repository 216 and policy repository 212 are databases, and can be implemented using devices such as a storage device, database, storage enclosure, or other storage and database applications, data warehousing, and database management systems similar to those manufactured by companies such as Microsoft (MySQL), Oracle (9i+), Sybase, and EMC. Both traffic repository 216 and policy repository 212 are configured to store a large number of records in one or more data structures.

Traffic repository 216 is designed to store and to communicate information related to traffic and route characteristics, and policy repository 212 is designed to store and to communicate flow policy information or rules to govern the performance and cost of each of the data traffic flows. One having ordinary skill in the art of database management should appreciate that many database management techniques may be employed to effectuate the repositories of the present invention.

In operation, flow control system 200 of FIG. 2 monitors egress and ingress data traffic flow 218, which may be representative of packet-based data traffic, to determine whether data flow 218 to and from source network 82 is within the performance tolerances set by policy, entered by users via controller 202 and stored in policy repository 212. Flow control system 200, in one embodiment, receives data flow 218 by replication, such as by a network switch, by using a splitter, such as an optical splitter, or any other tapping means know to those having ordinary skill in the art. Data flow 218, which is exactly, or near exactly, the same as the information contained within data flow 218, is provided to passive calibrator 214.

Passive calibrator 214 monitors the data traffic of data flow 218 and communicates information related to the traffic, traffic performance, and policy adherence to controller 202. Controller 202 is configured to receive policy data which may represent one or more policies that correspond to a particular traffic flow, such as a particular data flow. Moreover, the particular data flow can be associated with a certain user identified by a destination prefix, for example. From policy data, controller 202 determines the levels of performance, cost, or utilization that the particular traffic is required to meet. For example, controller 202 determines whether a particular traffic flow of data flow 218 is meeting defined performance levels (i.e., service levels) as defined by one or more requirements or criteria, such as inbound and outbound network latency, packet loss, and network jitter.

Active calibrator 210 functions to send and to receive one or more active probes, of varying types, into and from the data networks. These probes are designed to measure network performance including, path taken across one or more available providers (i.e., to determine if a provider is a transit AS rather than peer AS), next hop-in-use, and other network parameters. To activate active calibrator 210, controller 202 sends an active probe request to active calibrator 210. Such a request is required if controller 202 determines that additional information regarding alternative routes or network system characteristics are necessary to better enforce policies in reactive flow control systems, or alternatively, to prevent such policy violations optimized flow control systems.

Usage collector 204 is configured to receive NSP data via data director 206 which communicates with one or more NSPs, depending upon the type of NSP configuration. Generally, such configurations include the number of route ("pipes") associated with each provider and the data transfer rates, bandwidth allocations, redundancy provisions, data backup, and other performance characteristics associated with the NSP. Additionally, NSP data can relate to a provider's cost or billing structure and can also include each provider's associated set or subset of addresses, each provider's billing methods (i.e., byte/min, etc.), etc. Moreover, usage collector 204 is configured to collect usage information from the network elements, such as switches, border routers, provider gear, and other devices used to transport data over data networks. Usage collector 204 is configured to provide controller 202 with provider utilization and billing information, which represents aggregated data based upon NSP data and usage information. Often, utilization and billing information provide the basis for performance and operating parameters for flow control system 200. Usage data or utilization data (not limited to those embodiments described herein) can be measured in various ways to include connection or link time, data packet volume, or other metrics not included here specifically. Other utilization and billing information includes data that represents cost, billing, utilization, etc., for each NSP of interest.

One having ordinary skill in the art should appreciate that NSP data can be provided to usage collector 204 in a variety of ways. For example, data describing, defining, controlling, or modifying data paths as used for the data flows described herein can be provided by an entity having authority to do so, such as a network engineer entering the data into a computing device using a GUI in source network 82 of FIG. 1C.

Moreover, usage collector 204 is configured to monitor usage characteristics defining a network service provider's data traffic capacity, costs, etc. Usage data provided to usage collector 204 includes usage information and characteristics from network elements, such as switches, border routers, routers, provider gear, and other devices used to transport data over data networks. Usage refers to the data (i.e., data such as X Mb samples at time(0)) that represents instantaneous or near instantaneous measurement of characteristics (i.e., usage characteristics, data volume) that define, for example, the load and available capacity of each network service provider. Utilization is the usage rate over time. For example, suppose the usage collector monitoring NSP1 measures its utilization, or capacity over time, as X Mb at time(0) and Y Mb at time(1). This raw data, or usage, is used to calculate utilization, or usage rate for NSP1 (e.g., Y−X/time(1)−time (0)). Bandwidth is the total capacity each path or segment of path available for traffic flow. In one embodiment, the usage can be measured in any segment in any path at any number of hops or networks from a first point. Load is typically defined as the amount of capacity a particular path is used to carry data traffic and can be expressed as load/bandwidth.

Usage collector 204 is designed to generate utilization and billing information based upon usage information and NSP data sampled from data traffic flow 218. Since each of the providers has different cost and billing structures, as well as different methods of determining usage costs, usage collector 204 operates to aggregate usage information accordingly to provide controller 202 with utilization and billing information. Software applications or other means may be used to implement utilization and billing information for financial accounting purposes.

Usage collector 204 then provides the utilization billing information to controller 202 for each NSP of interest. One having ordinary skill in the art should appreciate that the usage collector can provide additional information based upon the provider usage information, to the controller, as needed to better effectuate route control.

Controller 202 collects information (i.e., aggregated performance and usage characteristics) from each of passive calibrator 214, active calibrator 210, usage collector 204, and optionally traffic repository 216. Based upon the information collected, controller 202 determines a course of action that best alleviates the policy violations in respect to the information represented by policy data that is conveyed to controller 202. Once the course of action is determined, controller 202 initiates and sends a network routing change request to configuration element 208, which directs data director 206 to alter data traffic flow through assigned NSPs. In a specific embodiment, controller 202 also provides data representing one or more alternate data paths that can be used to resolve a policy violation.

Configuration element 208 is designed to communicate routing changes in the network to data director 206. Once configuration element 208 sends one or more routing changes, data director 206 then moves data traffic flow 218 from a current path to another path (e.g., from NSP1 to NSP2 to NSPn or a first path of NSPI to a second path of NSPI). Data director 206 thus operates to distribute traffic to these destinations across multiple network service provider links based on, for example, the cost and performance measured across each link.

In operation, configuration element 208 communicates one or more routing changes with data director 206, for example, by using a routing protocol such as BGP. Configuration element 208 functions to dynamically control routing behavior by modifying the source address of the traffic passing through data director 206. The source address is modified in a way that improves application performance as well as cost requirements.

The following discussion is a more detailed description of each of the elements of flow control system 200. Active calibrator 210 provides active mechanisms within flow control system 200 for determining the nature of downstream or upstream paths. This information is typically not available in any conventional protocol used on data networks such as the Internet, and must be collected external to the normal processes of networking. As shown in FIG. 2, active calibrator 210 is coupled to controller 202 to provide at least a destination prefix that is not meeting the policy requirements, such as minimum performance level. Once received, active calibrator 210 then initiates a calibration process that determines most or all of the available network paths to the destination address as well as performance levels. Controller 202 is designed to select the most suitable probes that active calibrator 210 is to use, based on the particular policy requiring enforcement or correction, and thereafter to initiate active probing of network paths using active calibrator 208.

In one embodiment, active calibration probes are communicated to available network or Internet routes via available data routes from data director 206. The returning active calibration probes are received via data director 206. Active calibrator 210 then forwards probe information back to controller 202, which contains performance information including alternate available paths, which is stored in traffic repository 216. Controller 202 then determines how best to enforce the specifics of the policy associated with the subject traffic flow. Exemplary active calibrator 210 employs active calibration mechanisms to provide, for example, long term statistics.

In another embodiment of the present invention, active calibrator 210 resides in data director 206 within, or alternatively, integrated with controller 202. There are several proprietary implementations of commercially available routers suitable to practice the present invention. One example of suitable active probes is the RMON probe. Cisco systems use Service Assurance Agent ("SAA") that is derived from the remote monitoring ("RMON") probes to send out active probes. SAA allows routers to measure and report network-originated application round trip times ("RTT"). Although not every probe mentioned below is available in SAA for network calibration, one skilled in the art would appreciate how each of the following might be implemented to practice one or more embodiments of the present invention.

An exemplary active calibrator 210 can use ICMP (Internet Control Message Protocol) echo request or other ping-type probes, lightweight TCP-based probes, Sting probes, "pathchar" probes, lightweight probes using User Datagram Protocol ("UDP") packets with a predefined TTL (time to live), traceroute probes, or other active probes that are suitable for use by active calibrator 210 in accordance with the present invention. As used herein, "weight," whether heavy or lightweight, is a local measure of whether a particular data route is preferred over another. A weight is given to a data route on a particular router using a route map and intended for use only by that router. Thus, the lightweight probes referred to herein indicate that they are intended for a specific pre-specified or directed router, per a route map created in accordance with an embodiment of the present invention.

These probes are received back by active calibrator 210 of FIG. 2 are sent out by their source addresses. Such probes are all sourced and received on an exemplary stats computer system resident, for example, in the local premises, or as a stats process on a router. The active calibrator and its use of probes operate in accordance to probes described in a U.S. Patent Application, entitled "System and Method to Assure Network Service Levels with Intelligent Routing," having U.S. Pat. application Ser. No. 09/833,219 and filed on Apr. 10, 2001, and is incorporated by reference for all purposes.

Exemplary passive calibrator 214 of FIG. 2 is configured to receive, without interfering with, network communication data, such as customer network or Internet traffic. Network communication data routes (i.e., IP data traffic), as monitored by passive calibrator 214, include the default or current routes of data traffic flow 218 that is and is provided to passive calibrator 214 from data director 206. The currently routed path is, for example, the path (e.g., hop-by-hop) between routers that a packet would take, as determined by standard routing protocols, flow control policy, or other performances parameters. Passive calibrator 214 is coupled (i.e., electrically, optically, by radio waves, etc.) to controller 202 to provide information which indicates whether the specific IP data traffic is within the range of acceptable performance metrics, such as determined by a flow policy. Passive calibrator 214 operates to instantaneously monitor all traffic received via data traffic flow 218 and is designed to overcome the complications of relying solely on active traffic analysis, such as EMCP, as shown with respect to FIG. 1D. When the controller addresses policy violations, for example, passive calibrator 214 operates to overcome the complications of performing only active traffic analysis in the presence of multi-path (e.g., ECMP).

In another embodiment of the present invention, passive calibrator 214 examines the traffic stream in both directions (i.e., ingress and egress) and classifies each of the traffic streams into flows. Traffic flows, are monitored within passive calibrator 214 according to the underlying protocol state (e.g., such as regarding TCP sessions) over time. For example, passive calibrator 214 classifies the traffic flow according to round trip latency, percentage of packets lost, and jitter for each of the traffic paths. Such traffic route information is used to characterize the "end-to-end" performance of the paths carrying the traffic flows, which includes flow rates, and is aggregated into a series of network prefixes.

As described above, passive calibrator 214 is coupled to store, fetch and update traffic and route information stored in traffic repository 216 (connection not shown). Exemplary traffic repository 216 is a database configured to store and to maintain data representing traffic and route information that is useful to the end user employing a flow control system, such as flow control system 200 of FIG. 2, as well as the operators of, for example, a NSP. The data within traffic repository 216 includes long term statistics about the traffic. These statistics will be used for reporting, analysis purposes, and providing general feedback to a user of a flow control system according to the present invention.

Such feedback will consist, for example, of types of traffic being sent, source addresses, destination addresses, applications, traffic sent by ToS or DSCP ("DiffServ Code Point") setting (which might be integrated into a differentiated billing system), and volume of traffic. These statistics are fed into traffic repository 216 where, for example, a reporting engine or some other analysis application can access to the statistics. The information stored in traffic repository 216 is data representing such traffic route characteristics arranged in any suitable data structure as would be appreciated by one skilled in the art.

Figure 3:
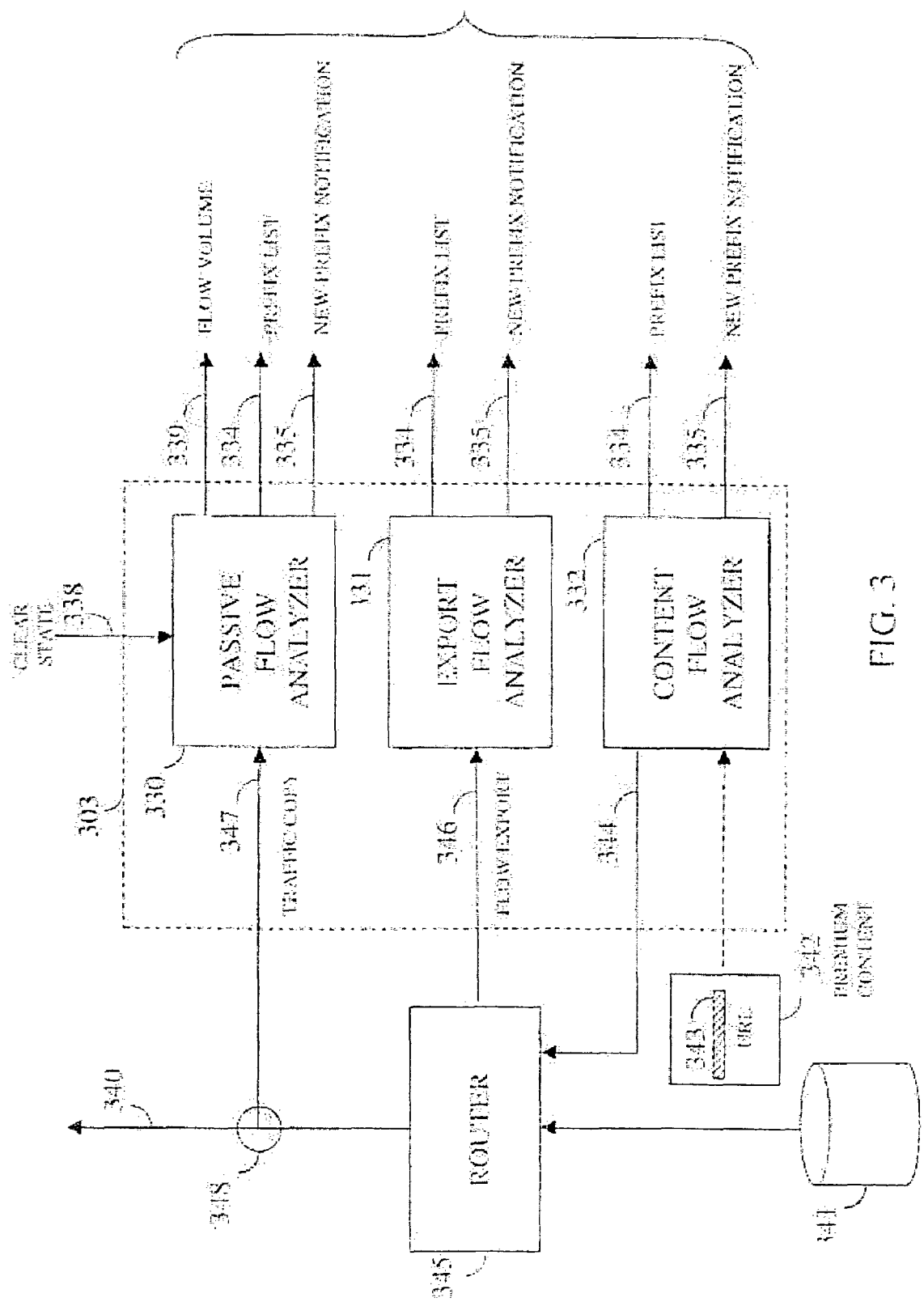
FIG. 3 is a functional block diagram of an exemplary passive calibrator of FIG. 2.

FIG. 3 is a detailed functional block diagram showing exemplary elements of a passive calibrator 303 according to an embodiment of the present invention. Passive calibrator 303 includes, for example, passive flow analyzer 330, export flow analyzer 331, and content analyzer 332.

In one embodiment, passive flow analyzer 330 performs passive analysis on the traffic to monitor current traffic flow characteristics so the controller can determine whether the monitored current traffic flow meets associated policy requirements. Export flow analyzer 331 performs passive analysis on exported flow records from a network device, such as from those devices (e.g., router) that advertise traffic type, source and destination addresses, and other information related to the traffic that it travels across service provider links. An example of such a network device is Cisco's Netflow™ product. In another embodiment, passive flow analyzer 330 operates in accordance to the passive flow analyzer described in the above-mentioned U.S. patent application of Ser. No. 09/833,219.

Content Flow Analyzer 332 performs passive analysis of specific elements of data content, such as web site content. Export flow analyzer 331 and content flow analyzer 332 determine a set of relevant prefixes or a prefix list 334 that is associated with a specific user's policy. Prefix list 334 is sent as data representing such prefixes to an active detection process in the controller. Prefix list 334 can be one or more lists or data structures configured to store data representing performance and usage characteristics and are designed to be receive a query, for example, by the controller. Once queried, the passive flow analyzer provides the one or more prefix lists, or portions thereof, to the controller for use in determining a policy violation, for determining which routes or path comply with the flow policy, which path is the optimum path for routing data, and the like. An exemplary prefix list that can be generated by export flow analyzer 331 and content flow analyzer 332, as well as passive flow analyzer 330.

Export flow analyzer 331 and content flow analyzer 332 also are configured to notify controller 305 when a previously unseen prefix has been added to the prefix list 334. New prefix notification signal 335 enables the control element 1005 to establish a new baseline performance for this prefix and to seed the routing table with a non-default path, or alternative path (i.e., non-BGP), if necessary. In one embodiment, export flow analyzer 331 and content flow analyzer 332 provide for monitoring of performance characteristics.

Content flow analyzer 332 is typically used when the main source of traffic flow 340 is web site or other content. Content source 341 can be configured such that special or premium content 342 that must be optimized can be identified by the flow control system by using, for example, an embedded URL 343. URL 343 redirects the client to a content server running on the content flow analyzer 332. Content flow analyzer 332 receives a request for the content element, which is generally an image file (e.g., 1×1 GIF) and is invisible or imperceptible in relation with the main original content, and responds to the client with the content element 344. Content flow analyzer 332 then stores or logs this transaction in log files and, by using the log files, content flow analyzer 332 is able to perform aggregation and assemble content prefix list 334. The list 334 is passed along to controller 205, for example, for active service level monitoring and policy enforcement.

Figure 4:
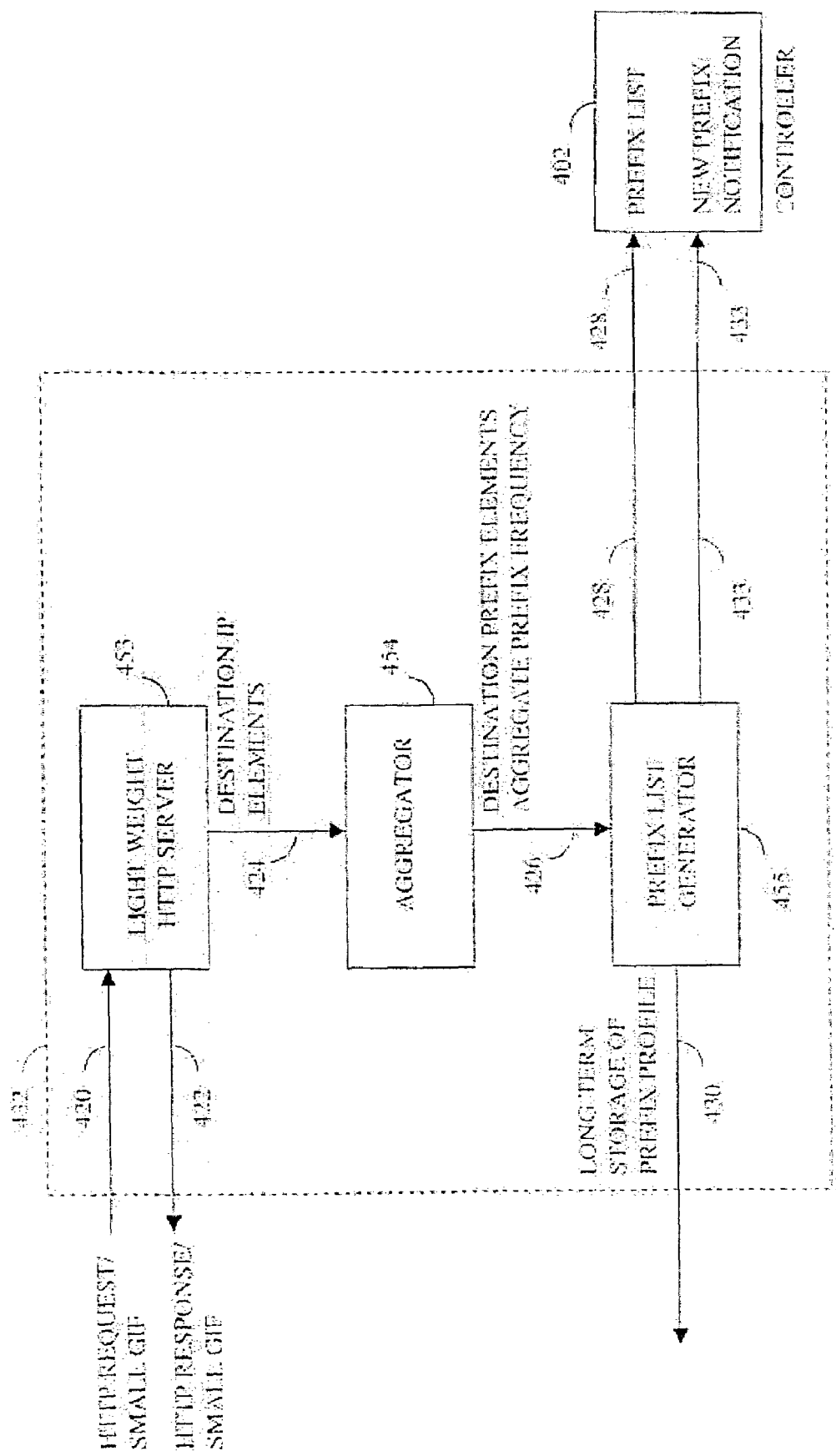
FIG. 4 is a functional block diagram of an exemplary content flow analyzer of FIG. 3.

FIG. 4 illustrates a functional block diagram of an exemplary content flow analyzer 432. Content flow analyzer 432 handles requests 420 for a small element of content, which is, for example, a 1×1 pixel image file that is imperceptible (although it need not be) on the resulting page. The small element is associated with the premium or generally specific pages of a larger set of content. The small element is, for example, a small redirect URL embedded within the content.

The small redirect URL acts to generate an HTTP request 420 in response to the small element of content. Content flow analyzer 432 sees this request 420 and responds 422 to it with, for example, a lightweight HTTP server 453. This server is fast and lightweight, and does nothing other than respond with the image file. The lightweight web server 453 logs the IP address of the client requesting the web page, and sends one or more IP addresses to aggregator 454. Aggregator 454 aggregates, or collates, individual IP elements 424 into prefixes of varying granularity (e.g., /8 through /32) and also aggregates the frequency that each prefix is seen over an interval of time.

That is, aggregator 454 classifies prefixes according to frequency of occurrence and provides aggregated (i.e., grouped) prefixes 426 to prefix list generator 455. Prefix list generator 455 creates destination prefix list 428 according, for example, to a prefix's importance in relation to the overall operation of the system as defined by the aggregated or grouped prefixes 426. For example, each monitored traffic flow is examined to determine the performance characteristics associated with a destination prefix or address.

Aggregate prefixes 426 are generally classified in terms of flow frequency, and average or total flow volume. Prefix list generator 455 sends updates to current prefix list 428 to controller 205 of FIG. 2, and also notifies other elements of the system with new prefix notification signal 432 when a new prefix is observed. Prefix list generator 455 stores the prefix information 430 to persistent storage for reporting and analysis purposes. A new prefix provides an additional alternate path or path segment that was unknown until a certain point of time. The new alternate path or path segment associated with the new prefix can provide for flow policy compliance, and thus can be used to re-route or modify the routing of data in accordance with a policy violation.

Referring back to FIG. 3, export flow analyzer 331 operates in conjunction with network elements that can export (i.e., communicate) flow information in a format useable by analyzer 331. One exemplary format is the Cisco NetFlow™ export format. Any network element designed to export flow information, such as router 345 or a layer 2 switch, thus is also configured to passively monitor the traffic it is processing and forwards export records 346 to export flow analyzer 331. Export flow analyzer 331 functions to process export flow records 346, aggregates the flows into prefix elements, and generates prefix list 334. The prefix list 334 is generally a subset of all prefixes observed by the flow control system. A prefix is selected from prefixes in the prefix list 334 based upon flow volume and flow frequency over an observation period. The selected prefix is placed into prefix list 334 before the list passed along to controller 205 of FIG. 2, for example.

Figure 5:
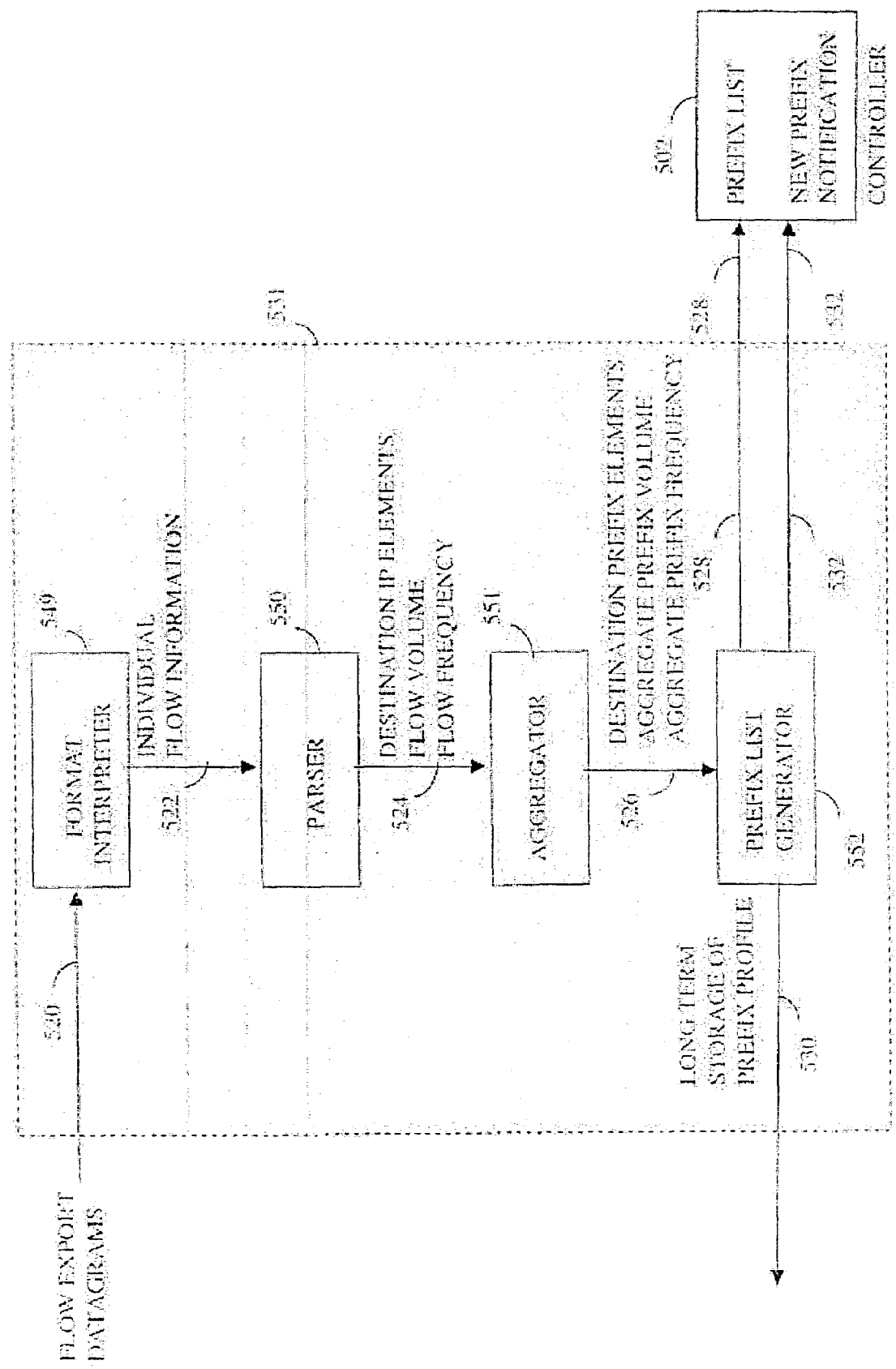
FIG. 5 is a functional block diagram of an export flow analyzer of FIG. 3 in accordance to one embodiment of the present invention.

FIG. 5 illustrates a functional block diagram of exemplary export flow analyzer 531. Export flow analyzer 531 includes format interpreter 549, parser 550 and prefix list generator 552. Format interpreter 549 is configured to receive export flow datagrams 520 from the network elements designed to send them. Format interpreter 549 then communicates individual flow information 522 to parser 550. Parser 550 operates to interpret destination IP elements from the flows monitored by the passive calibrator. Parser 550 also aggregates traffic flow according to total flow volume or transportation rate (e.g., in bytes/time unit) as well as flow frequency of destination addresses, for example, into aggregate elements. Thereafter, parser 550 sends the aggregate elements 524 to aggregator 551. Aggregator 551 then generates prefix-level destination information 526 (i.e., aggregate prefix volume and frequency) at a variety of prefix granularities (e.g., from /8 up through /32). In other words, aggregator 551 determines the frequency, session, or for a specific prefix and the aggregate volume of occurrences related to that prefix over an observed time interval.

Destination prefix list 528 is generated by prefix list generator 552 by, for example, ranking and organizing traffic flow characteristics related to prefixes in order of relative importance. List 528 contains data representing an aggregation of prefixes prefix list 528 and is organized in determines the relevance, as determined by the system or an entity to ensure policy enforcement. For example, one or more prefixes can be ordered in terms of flow frequency and average or total flow volume in relation together prefixes available in the overall system. Prefix list generator 552 sends updates to the current prefix list to controller 205 of FIG. 2 and also notifies other elements of the system when a new prefix is observed via a new prefix notification signal 532. Prefix list generator 552 stores all prefix information 530 to persistent storage for reporting and analysis purposes.

Figure 6:
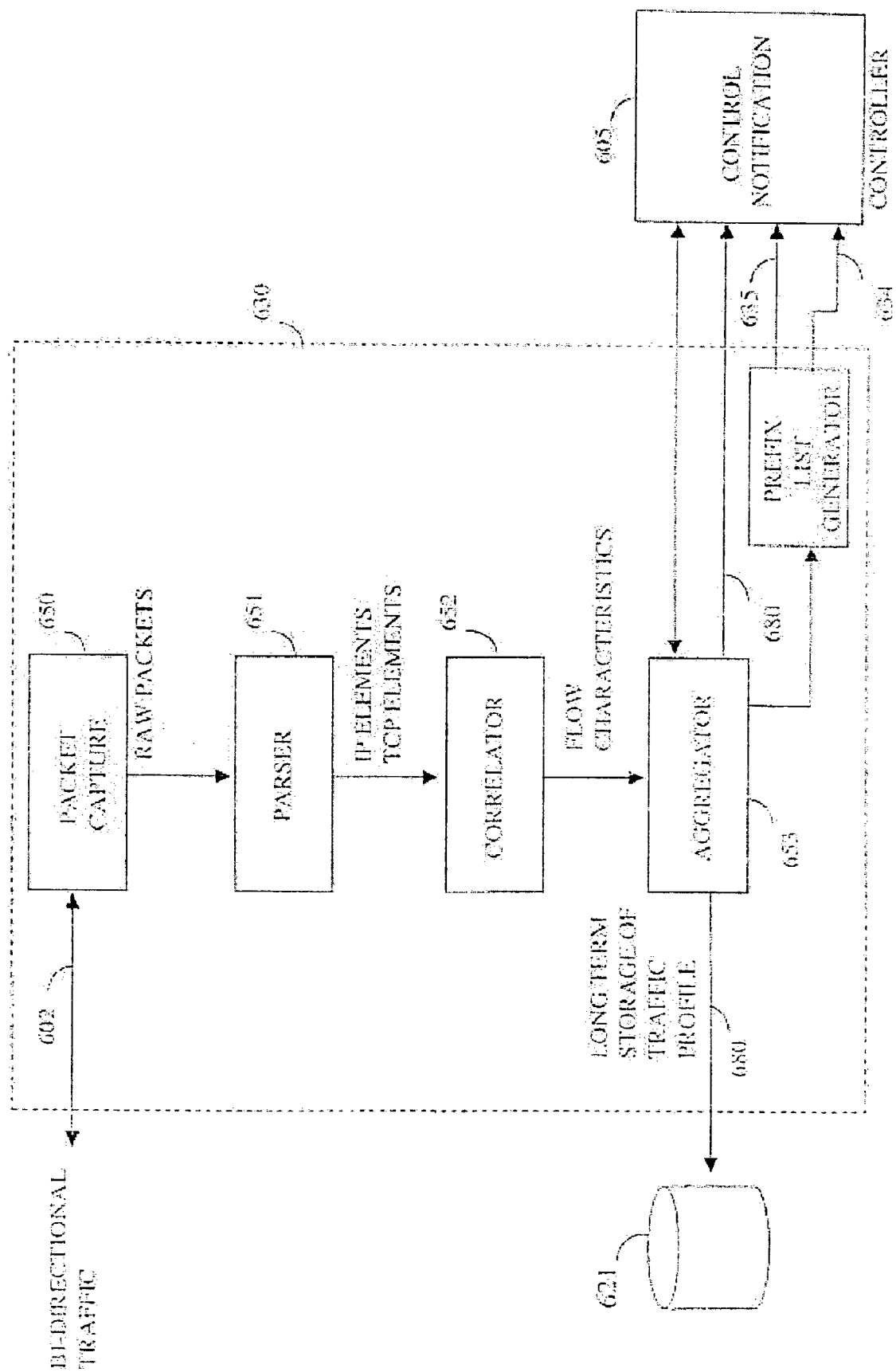
FIG. 6 is a functional block diagram of a passive flow analyzer of FIG. 3 according to a specific embodiment.

FIG. 6 illustrates a function block diagram of an exemplary passive flow analyzer 630 of FIG. 3. In one embodiment, passive flow analyzer 630 is designed to generate prefix list 634 and new prefix notification signal 635 and generates aggregated flow data 680, including network performance and usage statistics grouped into relevant characteristics. For example, prefixes of a certain size can be aggregated, or grouped, from highest traffic volume to lowest as observed over time. The aggregated flow data 680 is communicated to controller 605 and are used by the controller to determine whether the current traffic flow violates or fails to conform to an associated flow policy for a given destination. The passive flow analyzer 630 also functions to store aggregated flow data 680 in traffic repository 621, where it can be used for characterizing historical route and traffic flow performance. In another embodiment of the present invention, a prefix list generator is not included in the passive flow analyzer of FIG. 6.

Passive flow analyzer 630 uses a copy of the traffic 602 via a passive network tap or spanned switch port, as shown in FIG. 2, to monitor the network performance for traffic. Passive flow analyzer 630 also can monitor and characterize UDP traffic patterns for detection of anomalous behavior, such as non-periodic traffic flow, or the like. Passive flow analyzer 630 can use various neural network techniques to learn and understand normal UDP behavior for the application in question, and indicate when that behavior has changed, possibly indicating a service level violation which can be verified or explained with well known active probing techniques.

Additionally, passive flow analyzer 630 is designed to be "application-aware" according how each of the particular traffic flows is classified. Traffic can be classified according to the classifier described in the above-mentioned U.S. patent application Ser. No. 09/833,219. Passive flow analyzer 630 can inspect the payload of each packet of traffic 602 to interpret the performance and operation of specific network applications, such as capture and interpretation of the Realtime Transport Control Protocol ("RTCP") for voice over IP ("VoIP"), for example.

In FIG. 6, passive flow analyzer 330 includes packet capture engine 650, packet parser 651, correlation engine 652, and aggregator 653. Packet capture engine 650 is a passive receiver configured to receive traffic (e.g., IP data traffic) coming into and out of the network. Capture of traffic is used to facilitate traffic analysis and for determining a whether a current traffic route meets minimum service levels or policy requirements. Packet capture engine 650 is designed to remove one, several or all packets from a traffic stream, including packets leaving the network and entering the network. Packet capture engine 250 operates to remove certain packets up, for example, from the network drivers in the kernel into user space by writing custom network drivers to capture part of a packet. Using DMA, the partial packet can be copied directly into user space without using the computer CPU. Such packets are typically removed according to one or more filters before they are captured. Such filters and the use thereof are well known in the art and can be designed to, for example, remove all types of TCP traffic, a specific address range or ranges, or any combination of source or destination address, protocol, packet size, or data match, etc. Several common libraries exist to perform this function, the most common being "libpcap." Libpcap is a system-independent interface for packet capture written at the Lawrence Berkeley National Laboratory. Berkeley Packet Filter is another example of such capture program.

Parser 651 is coupled to receive captured raw packets and operates to deconstruct the packets and retrieve specific information about the packet from each in the traffic flow. Exemplary parser 651 extracts information from the IP and TCP headers. Such extracted information from the IP headers include source and destination IP addresses, DSCP information encoded in the ToS (i.e., "type of service") bits, and the like. DSCP carries information about IP packet QoS requirements. Each DSCP defines the Per Hop Behavior of a traffic class. DiffServ has 64 code points so that it can define 64 different types of traffic classifications. TCP header information includes source and destination port numbers, sequence number, ACK number, the TCP flags (SYN, ACK, FIN etc.), the window size, and the like.

TCP elements parsed from the TCP headers are especially useful in determining whether a policy is being enforced, in terms of performance. An increasing amount of traffic, however, does not rely on TCP and instead uses UDP. UDP does not contain the necessary information to determine service levels according to conventional approaches.

To determine service levels to these destinations, the present invention might employ a statistically relevant amount of collateral TCP traffic going to the same prefix or a series of active probes to the same destinations, or have the analyzer parse deeper into the packet and understand the traffic at the application layer (e.g., layer 7). There are some protocols running on UDP that have very specific requirements that are different from most other data traffic on the network. These protocols are loosely classified as "real-time" protocols and include things like streaming media and Voice over IP. Packet loss and latency, below a certain level, are secondary concerns for real-time protocols.

Most importantly, however, is reducing the variance in inter-packet arrival times (i.e., network jitter). Many real time protocols and standards such as H.323 as defined by the International Telecommunications Union (ITU) report the observed jitter in back channel communication known as the RTCP ("Real-Time Transport Control Protocol"), which is used to distribute time-dependent media data via IP multicast with feedback. If passive flow analyzer 630 of FIG. 3 is "application-aware," it can capture and observe the contents of the RTCP and be aware when the underlying network path is not meeting minimum jitter requirements. This could trigger an SLA violation in the same manner that 30% packet loss would.

Correlator 652 operates to interpret and to group the packet elements (e.g., TCP and IP) from the packets to determine the current service level of the flow and then groups the packets into a specific traffic flow. Flows are reconstructed, or grouped, by matching source and destination IP addresses and port numbers, similar to the process of stateful monitoring of firewalls. Correlator 252 determines the current service level by measuring several traffic characteristics during a TCP transaction. For example, correlator 252 determines the round trip time ("RTT") incurred on a network, and hence, this serves as a measure of latency for the network traffic.

Figure 7A:
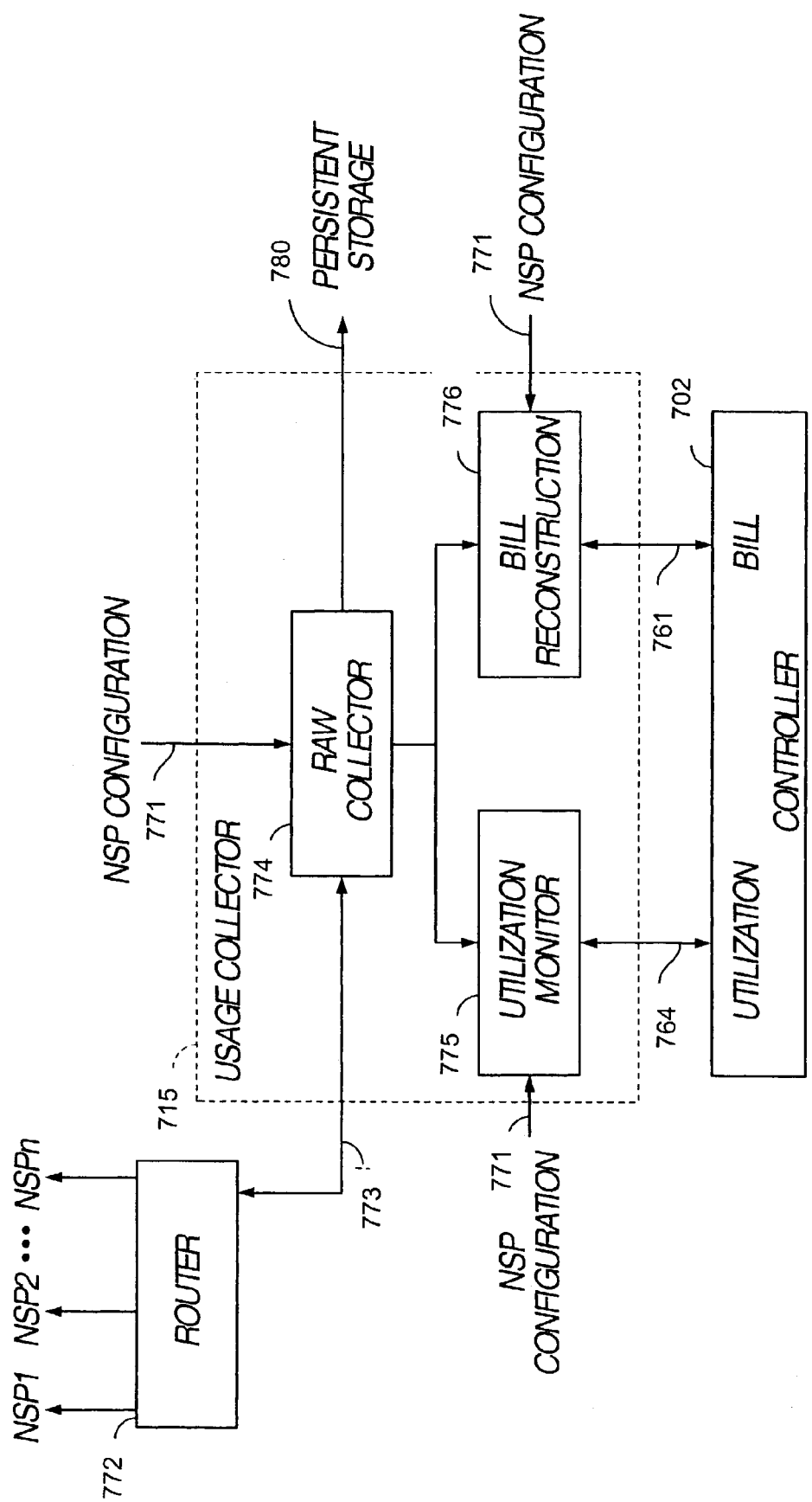
FIGS. 7A-7B are detailed block diagrams of exemplary usage collector and configuration elements according to different variations of embodiments of the present invention.

FIG. 7A illustrates a detailed block diagram of usage collector 700 of FIG. 2. Usage collector 715 operates to collect usage information 773 from network providers, such as byte counters (i.e., the amount of traffic transmitted to and received from network service providers). Usage collector 715 uses this information to calculate network service provider utilization, load, etc., of data paths associated with the provider.

Usage collector 715 also operates to reconstruct provider billing records. Usage collector 715 accepts provider configuration information 771 related to each network service provider (NSP) connection. This NSP configuration information 771 details provider interfaces on the various routers 772 (e.g., egress routers), provider next-hop IP addresses traceroute probes (to verify the current provider in use with trace probes), billing period start and end dates, circuit bandwidth for calculating the utilization and price per megabit/sec, minimum bandwidth commitment, burstable rates, provider sampling interval, provider billing algorithm, a utilization alarm threshold and the like.

In operation, exemplary raw collector 774 sends a query 790 (e.g., SNMP) to collect interface raw byte counters from routers 772 on each of the provider circuits at a specified sampling interval. Provider circuits include paths, pipes (virtual or physical), T1, and the like. Raw Collector 774 places the raw byte counters 780 into persistent storage for later reporting and analysis. Raw collector 774 sends the raw information to two other components: utilization monitor 775 and bill reconstructor 776.

Utilization monitor 775 calculates the ingress and egress circuit utilization for each provider using the raw byte counts and the NSP configuration information 771. In one example, NSP configuration information 771 includes the bandwidth of the provider's circuits. Utilization information 764 includes data representing utilization trends for use with short range forecasting models (e.g., ARIMA, exponential smoothing, etc.) such that utilization monitor 775 can determine whether bandwidth is trending up or down (i.e., increasing or decreasing in size) for a given service provider.

Bill reconstructor 776 uses the billing information from NSP configuration data 771 to reconstruct the current provider billable rate for the current billing period. Billing information includes information explaining the methods that specific providers use to calculate costs, such as a billing rate. Such methods of calculating bills for using a network provider are well known in the art. Bill reconstructor 776 applies similar provider billing methods to the raw byte counters from raw collector 774 to generate the bill and related billing rates, etc. The generated bills, which are mapped into dollar amounts, are typically estimates since the sample times between the provider and usage collector 715 will not match exactly. Bill reconstructor 776 will send billing information 761 to controller 702 for use in peak avoidance and least cost routing. Peak avoidance is defined as a method of avoiding using a path or path segment at a higher a billing rate. Least cost routing refers to a method of using or defaulting traffic to the least expensive provider.

Additionally, information can be sent to controller 702 for use in the least cost fix method of selecting the cheapest if performance is of no consequence. That is, controller 702 uses data from billing message 761, including billing rates, to determine an alternate path based in part on a path's free bandwidth (i.e., path does not incur additional cost to use), in accordance with the flow policy.

Figure 7B:
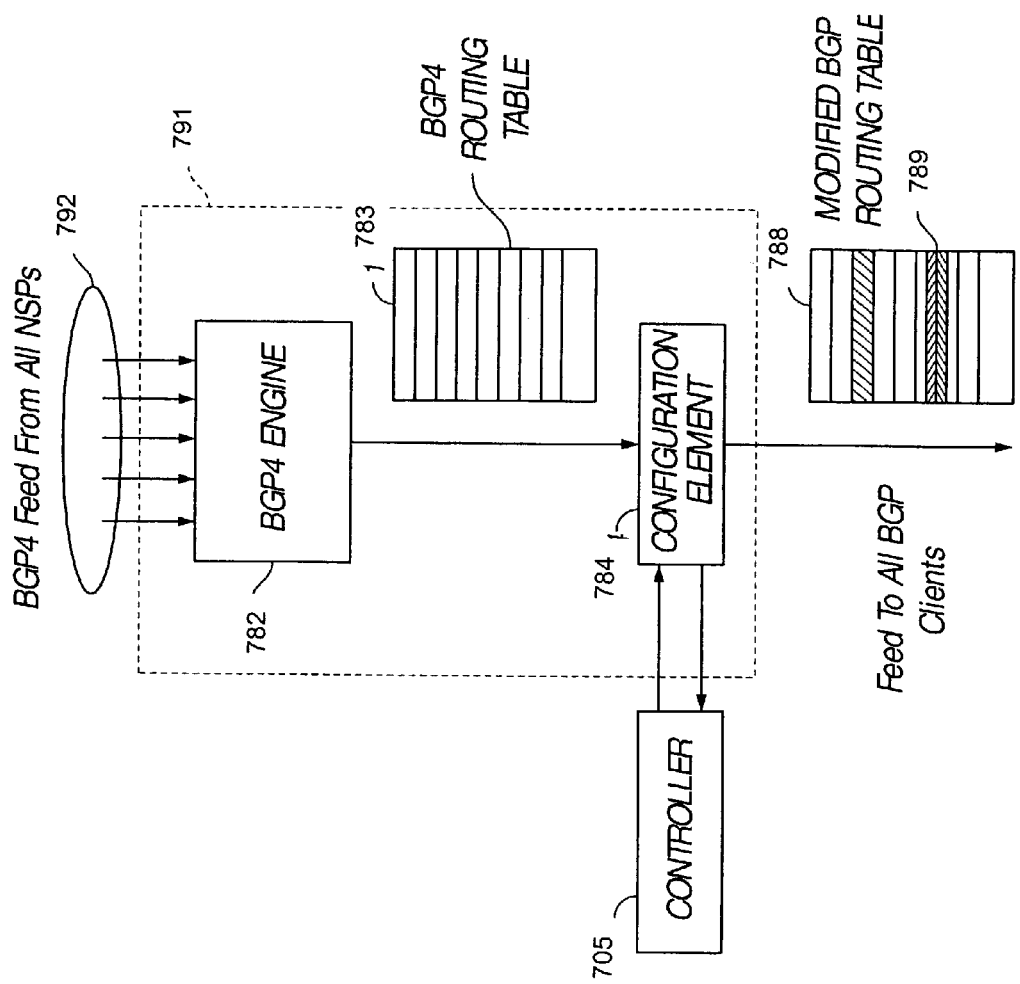

FIG. 7B shows an example of yet another embodiment of the present invention, where controller 705 communicates with configuration element 784. Controller 705 and configuration element 784 are analogous to the similarly-named elements of FIG. 2. Configuration element 784 of FIG. 7B operates similarly to other adaptations of configuration elements described herein. That is, configuration element 784 modulates the current or default routes of data traffic and thus modifies the default routing behavior, for example, in a local deployment (e.g., Point of Presence, or "POP"). Route server 791 ("RS") receives a full set or subset of routing tables from the data networks of interest. Although a route server 791 is implemented as a configuration element, alternative embodiments of the present invention may use other protocols besides BGP, such as a modulated source address, routing data into multiple security tunnels through a firewall, or other IP security measures.

In one embodiment, the routing tables are received into route server 791 by way of one or more default BGP feeds 792 into BGP Engine 782 from a full set or subset of the local transit providers. In FIG. 7B, BGP4 is indicated as the protocol version of BGP desired for implementation. However, future revisions to BGP or successive protocol groups may be released to replace BGP4 and the embodiments of the invention described herein are not intended to be limited to only BGP and BGP4. It is envisioned that other protocols and versions of inter-networking protocols may be used in place of those described herein.

Referring back to FIG. 7B, BGP4 Engine 782 integrates, or merges, all of the routes into a single BGP4 routing table 783 best available routes. In another embodiment, route server 791 maintains an iBGP session with all of the internal BGP capable routers rather than maintaining the BGP4 sessions as shown in FIG. 7A. With a single iBGP session there is no need to configure all of the BGP sessions with the network service providers before making route changes.

Configuration element 784 is designed to receive one or more BGP4 routing tables 783 from BGP4 engine 782 and is adapted to receive one or more control signals and data resulting from the control processes of controller 705. In operations, configuration element 784 receives, from controller 705, the necessary routing changes to be implemented in default routing table 783. Then, configuration element 784 incorporates one or more changes in modified routing table 789.

Thus, configuration element 784 operates to modify BGP4 routing table 783 and to generate one or more modified BGP4 routing tables 788. Modified BGP4 routing table 788 includes changed routing 789, advertisements of more specific routes, etc. New modified BGP4 routing table 788 is then fed to all BGP clients in the network, which then is used to guide traffic to the destination.

Each of the embodiments described in FIGS. 3, 4, 5, 6, and 7 provide information related to the implementation of controller 202 (as defined in FIG. 2). In each of FIGS. 3 through 7, detailed information is provided to enable one skilled in the art to implement controller 202 and communicative resources such as usage collector 204, data director 206, configuration element 208, active calibrator 210, and passive calibrator 214. Referring back to FIG. 2, configuration element 208 is coupled to controller 202 and to data director 206. Controller 202 provides the best path to reach a destination prefix to configuration element 208. Configuration element 208 operates to change the default routing behavior (i.e., current path) for the destination requiring corrective action. Configuration element 208 changes the routing behavior by, for example, sending a modified routing table of addresses to data director 206.

Once data director 206 receives this information, controller 202 is informed that a route change has been implemented. Thereafter, controller 202 communicates with passive calibrator 214 to clear its state and to resume monitoring the destination. The destination is monitored to ensure that the updated path of the routing table, or path, meets minimum service levels (e.g., no violations of SLA, no unacceptable deviations from agreed upon performance metrics as defined by policy, criteria for best performance, or other flow policy exceptions, as discussed below with regard to events in controller 202 logic).

In one aspect, configuration element 208 enables configurations to data traffic flow 218. Configuration element 208 may reside within a server, security tunnel, network switch, IP security device or application, load balancer, firewall, or other security-enabled device for use with a network used when connecting one or more paths between a destination and a source or sending modified traffic through a single path. In another aspect, configuration element 208 resides in a router and is configured to modify a route map or table. In yet another aspect, configuration element 208 is adapted to provide configuration information which may be stored in a data structure such as a routing table. In still yet another aspect, the path information is stored within the configuration element 208 according to whether it is related to inbound or outbound traffic.

For a given source address, the ingress point into a network is determined typically by the advertisements of routes made to downstream providers and a provider policy (set of rules that is set up by such providers). Eventually, the network service provider (e.g., "NSP," "ISP") that is hosting the destination will receive advertisements, announcing preferred routes, destinations, paths, and routing changes made by controller 202 in accordance with an embodiment of the present invention. For example, in one embodiment of the present invention, advertising or announcing a route prefix of "/16" would indicate that only the first 16 bits of the address are relevant and, given that 32 bits are available to describe a specific address, that all related and subsequent addresses to that prefix would also be considered as part of the advertised path.

Controller 202 of FIG. 2 is designed to receive performance characteristics, such as latency, loss, jitter, etc., as monitored by the calibrator elements as well as usage characteristics, such as bandwidth, costs, etc., as monitored by the usage collector. Controller 202 is coupled to policy repository 212 to receive policies, discussed in greater detail below, which typically include minimum performance metrics and other decision criteria such as cost/performance priority and measurement behavior. These metrics, or requirements, are compared against the monitored performance and usage characteristics. As discussed below in connection with FIGS. 8A, 8B, 8C and FIGS. 13A-13C, many decision (e.g., cost, performance) criteria for flow policies are developed by controller 202.

If a particular policy is violated (i.e., one or more performance and/or cost metrics are outside one or more expected ranges or values), controller 202 determines a subset of one or more alternate data paths that conform to policy. In another example, controller 202 selects a best or optimized path as an alternate data path that best meets the performance requirements and usage requirements, (e.g., billing profiles and contracts, cost policies per individual NSP, static and dynamic policies either system-specified or user-configured) as defined by the policy. The following discussion relates to policies and the application of such policies in resolving policy violations, enforcing the policy requirements or metrics, and policy examples.

Referring back to FIG. 2, controller 202 communicates with policy repository 212 for receiving one or more policies. In accordance with one embodiment of the present invention, there are policy states per destination which include, New or Aged Out, Exception (this may also refer, in general, to policy violations, in accordance with other embodiments of the present invention), High Volume, and Static Persistent Prefix (es). New or Aged Out policy state describes an event in the controller 202 logic where a new path or an existing path has aged out and is seen by controller 202. Exception refers to a policy exception or performance violation outside of specified policy bounds which, when seen, may result in a path change by controller 202. High volume is a policy state where, when volume level criteria are met, a path selection is implemented where the current path can be selected. Static persistent prefix(es) is a state which results in the prioritizing of a particular prefix or set of prefixes which, when seen by controller 202, result in a path selection, again, where the current path can be selected. Path selection states can be either long duration or persistent. In accordance with an embodiment of the present invention, these events or states in controller 202 logic ensure that the best performing path is persistently sought and selected, unlike conventional techniques such as BGP, which fail to adjust to the best performing path. Although an exemplary policy includes requirements, or rules, related to detection, performance, cost, and precedence, one having ordinary skill the art should appreciate that less, or additional parameters, can be measured and enforced according to an embodiment of the present invention.

Detection is defined as the techniques or mechanisms by which flow control system 200 determines which traffic that should be acted upon in response to policy. The traffic flow can be identified, by name, by source or destination addresses, by source or destination ports, or any other known identification techniques. For example, a policy can be identified by address prefix. That is, flow control system 200 will monitor the traffic flow to and from a specific prefix, and if necessary, will enforce policy in accordance to its requirements. Further regarding detection, a policy defined for more specific prefixes can take precedence over more general prefixes. For example, a policy defined for a /24 will take precedence over a /16 even if the /16 contains the specific /24.

Performance is a policy requirement that describes one or more target performance levels (i.e., network/QoS policy parameters) or thresholds applied to a given prefix, prefix list, or other identified set of destinations (e.g., identified by application, port, protocol, etc.). Although more than one performance-based policy requirement may be defined, in this example only a single policy is applied to a given prefix or prefix list. Exemplary performance requirements include loss, latency, and jitter.

Moreover, such requirements can be configured either as, for example, an absolute, fixed value or as an Exponentially Weighted Moving Average ("EWMA"). In another embodiment, absolute value establishes a numerical threshold, such as expressed as a percentage or in time units over a configurable time window. The EWMA method establishes a moving threshold based on historic sampling that places an exponential weighting on the most recent samples, thereby asserting a threshold that can take into account current network conditions as they relate to historic conditions.

In another embodiment, requirements can be configured using Statistical Process Control ("SPC") techniques. SPC techniques are leveraged to determine when the network performance for a given prefix deviates from the observed and desired performance. SPC generates upper and lower control limits (UCL, LCL) based on the historical mean performance. The UCL/LCL is a fixed delta (e.g., ms) from the long running observed mean. However, RTT is tightly correlated to geography, and this prohibits the simple applications of SCP where UCL/LCL is determined using a 'fixed' delta (e.g., 10 ms) or a fixed percentage of the observed mean. (e.g., 10% deviation is considered an exception).

Most process control techniques assume data that is normally distributed, in which case there are a myriad of process control charts that can be applied. However, performance metrics such as network latencies are not normally distributed and as such the standard process control charts, which define deltaU and deltaL cannot be used. DeltaU and deltaL are used from the mean to calculate UCL/LCL. As such the process control chart which defines UCL/LCL is unique for different performance values. This results in a banded approach for determining a unique process control chart and hence, UCL/LCL. Volume profiles can be defined around bands or values and will be discussed in greater below with regard to FIGS. 10 through 13C. Each profile has a defined performance (e.g., RTT, % loss, time-of-day) range (e.g., 0-10 ms, 11-25 ms and so on) with a defined deltaU and deltaL value for each metric.

In the purest sense, the function that determines deltaU/deltaL is a non-linear function of the mean RTT. In yet another embodiment of the process control chart, this function was approximated for several mean performance values such as RTT space. This results in a single continuous process control chart that is relevant to all performance values.

UCL and LCL define the operating range where two sets of performance numbers should be considered 'equivalent.' It is only when a candidate network performance is outside the operating region defined by UCL/LCL that a change is warranted. This will prevent a situation where a slight difference in a performance metric, such as RTT or loss, can cause a route change.

Network performance 'Exceptions' occur when several performance samples are observed above the UCL or below the LCL. Differences between the observed samples and the UCL and LCL which do not exceed the UCL/LCL are considered to be within a range of equivalence. However, exceptions, when defined as a number of samples above or below the UCL/LCL, indicate that the underlying system (i.e., the network) has changed in a fundamental manner, (e.g., system performance improves or degrades such that UCL/LCL are exceeded). For example, in the event of an Exception, downstream flow control policy components can examine candidate paths and determine if better performance is available from an alternative provider.

While the configuration of the SPC varies, an example default configuration for exception detection of an RTT performance metric is:
1) Collect sufficient initial data to establish mean
2) From long running mean RTT, calculating UCL/LCL from process control chart
3) If a 'sample' is observed above the UCL/below the LCL, increment violation count, but maintain the previous historical mean RTT
4) If n concurrent samples (e.g., defining the algorithm sensitivity, default n=3) are observed above the UCL/below the LCL the system has changed. Discard the historical mean RTT (as it is no longer relevant in the new system) and tag the prefix as an Exception in controller
5) Start collecting a new historical mean
6) Steps 1-5 may be applied to other performance metrics in a similar manner Cost can be expressed in a policy as a requirement or rule in terms of precedence and whether the policy is predictive or reactive. Costs are characterized by usage collector 214 of FIG. 2 through bill reconstruction and reconciliation of bandwidth utilization in both aggregate and very granular levels (e.g., by /24 destination network). Cost predictive requirements are used to proactively divert traffic from one provider to another in order to avoid establishing a peak (i.e., "peak avoidance") that may trigger a new or higher billable rate. Cost reactive requirements are used to reactively divert traffic from one provider to another when a minimum commit rate or current billable rate is exceeded.

Typically, both cost predictive and reactive requirements result in a binary decision (i.e., a circuit or path, for example, is either in compliance with or in violation of a flow policy). In the case of predictive cost, the transit circuit is either in compliance, or soon to be violation of a flow policy. Regardless, an action must be taken to resolve the situation, unless cost is preceded by performance (i.e., performance requirements are to be addressed prior to making a cost-based change).

Precedence is a policy requirement that describes one or more target usage or utilization characteristics or levels. Precedence includes provider preference and maximum utilization (i.e., load) requirements. The provider preference requirement is, for example, an arbitrary ranking of providers that is used when an action must be taken, but when two or more transits may be selected in order to enforce the policy. The flow control system can automatically set the provider or path preference requirement if it is not configured explicitly by the system's operator. This requirement is then applied as a tiebreaker in deadlocked situations such that the provider with the highest preference is selected to receive the diverted traffic flow.

The maximum allowable utilization can be used as an actual operational threshold not to be exceeded or as a tiebreaker. Maximum usage is configured, for example, in the transit provider section of the configuration and takes either a percentage argument (i.e., in terms of available bandwidth), or alternatively, can be set as an absolute value in terms of Mb/s (i.e., not to exceed available bandwidth).

Policy examples, in addition to those described above, can be applied to each destination and may include minimum performance metrics (e.g., loss, latency, jitter), and measurement behavior (e.g., duration, exclusion, frequency, RTT, etc.). Other policy examples include the ability to specify routing changes on/off (i.e., specified parameters enabling an embodiment of the present invention to record results, but make/not make routing changes, if criteria are met), decision criteria (e.g., cost/performance priority), thresholds (e.g., dynamic, static) or other criteria which can be configured and stored in policy repository 212. In accordance with an embodiment of the present invention, dynamic thresholds are based upon a historical baseline, from which all derived information goes into a repository or data structure. Static thresholds, on the other hand, are arbitrary user-defined baselines which provide the basis for establishing, for example, a static performance threshold with minimum performance levels.

In summary, the policy, such as the above exemplary policy, is input into the controller 202 of FIG. 2 and is associated with, for example, a specific prefix. The general detection method (absolute or baseline/historical) can be specified as per prefix, thus specifying hard or absolute thresholds for some destinations that are well known, while using a baseline method for other destinations. The policy also defines the resolution method (e.g. procedure) to be used in the combination with performance metrics that must be met before the exception is considered resolved. Other parameters such as cost/performance priority can be set per prefix. This gives the controller an indication of which prefixes should never be degraded for cost or utilization reasons.

The active calibrator and the passive calibrator provide performance characteristics. Regarding the active calibrator, controller 202 initiates active calibration by requesting active probing. The active calibrator sends one or more calibration probes out into the one or more data networks. Responsive information received in response to the probes provides information back to controller 202, which contains the identities of available paths and performance information related thereto.

Regarding passive calibrator 214, controller 202 is designed to receive real- or near-real time network performance characteristics (i.e., loss, latency, jitter, etc.) from passive calibrator 214 as monitor in traffic flows in which it has access. In accordance with an embodiment of the present invention, controller 202 can be set to only record changes. However, in another embodiment of the present invention, controller 202 can be set to record and make changes to traffic flows, based upon real-time network performance characteristics. Control signals initiate clearing the passive calibrator 214 state to enable the passive calibrator 214 to resume monitoring of the specific destination to ensure that the updated route of the routing table, or path, is complying with recorded flow policies. Control signals to clear the passive calibrator 214 state come from the controller 202 to initiate the resetting of the passive flow analyzer 330 state. However, in other embodiments of the present invention, control signals may not be necessary to clear the passive calibrator 214.

In an example, controller 202 operates to interpret candidate performance for alternative performance for newly observed or aged destination prefixes. Controller 202 determines which of the alternate path or paths, is best suited for the prefix or traffic type associated with the current traffic flow. As discussed above, controller 202 can also interpret candidate performance in newly observed or aged destination prefixes, and make changes to traffic flows accordingly. Controller 202 then sends the necessary routing changes to configuration element 208. That is, controller 202 finds the best initial baseline in accordance with policy. This process is repeated if the prefix ages again without subsequent measurement. If the prefix is also listed as either an exception, a high volume prefix, or a very important prefix, controller 202 can also make necessary routing changes to configuration element 208.

In another embodiment, controller 202 operates to interpret candidate performance for alternative performance for high volume destination prefixes. These prefixes are significant when compared against lower data volume prefixes. Controller 202 determines which of the alternate path or paths, is best suited for the prefix. Controller 202 then sends the necessary routing changes to configuration element 208. That is, controller 202 finds the best performance in accordance with policy. This process is repeated until the prefix fails to meet high volume criteria stored in the policy repository, e.g., volume levels (such as top "n" level, i.e., top 100%), flow levels, or other system configurations specified and stored in the policy repository.

In yet another embodiment, controller 202 operates to interpret alternative path performance for destination prefixes that have static persistent prefix(es). These prefixes are significant as specified by the user and are persistently measured. Controller 202 determines which of the alternate path or paths, is best suited for the prefix associated policy. Controller 202 then sends the necessary routing changes to configuration element 208. That is, controller 202 again finds the best performance in accordance with policy. This process is repeated as long as the static persistent prefix exists.

In a further embodiment, controller 202, as depicted in FIG. 7A as element 702, is designed to receive real- or near-real time data representing network usage characteristics from usage collector 715, such as usage rate, billing rates, etc. Controller 702 uses this information to resolve policy violations relating to non-compliant usages characteristics, in accordance with policy. That is, prior to or during a route change, controller 702 analyzes the performance of alternate paths for a set of active prefixes or destinations and also determines whether those alternate paths either avoid peak data traffic over a specific provider's path (i.e., adequate bandwidth related to time-of-day) or are the least cost paths in view of the flow policies.

To resolve usage-type policy violations, controller 702 is configured to receive routing tables, for example, to determine which of the current traffic flows or routing of data on certain paths, or path segments thereof, are congested (i.e., loaded) with respect to a particular provider path or paths. Controller 702 receives flow data to determine which flows are active on the NSP which is indicated as "full" (e.g., no available bandwidth). Controller 702 also uses flow data to determine the volume of the active flows, aggregated into prefix volumes. The controller 702 also uses the flow data to determine the stability of the flow volume. Stability is, in accordance with an embodiment of the present invention, desirable, particularly when a cost change is made, but remains unaffected when the traffic flow volume decreases or ceases. From the flow data, controller 702 can determine which prefix(es) and the number of prefix(es) that need to be moved in order to correct an exception, e.g., a cost violation. Also important is flow volume projection.

Projecting flow volume is important when making changes in a cost-constrained environment. If a flow is being moved because of cost constraints, understanding the volume to and from a given NSP affects the accuracy of the decision. In an embodiment of the invention, it is possible to scale the observed volume on the existing provider based on the current and projected RTTs to estimate flow volume at the destination. The delay bandwidth product governs that flow volume for TCP is a function of window size and RTT. If average window size remains constant across providers, flow volume can be scaled by using RTT. For example:

Volume=window/RTT
Volume(observed)=window/RTT(observed)
RTT(observed)=RTT(convergence point)+C
Volume(projected)1=Volume(observed)(RTT(observed))/ RTTcp1+C
Volume(projected)2=Volume(observed)(RTT(observed))/ RTTcp2+C Thus, controller 702 is designed to obtain information related to the performance and usage of data networks and to implement corrective action to achieve the NSP policy (e.g., lowest network cost, load balancing, etc.) in data routing over flow control system 200 in data traffic flow 218 via associated NSPs.

In order for controller 202 to handle peering connections, controller 202 communicates with data director 206 to retrieve reachability information (i.e., routing tables) for the specific prefix that is about to be changed. In the case of transit circuits, controller 202 uses active calibrator 210 to determine reachability information (i.e., routing tables) to a given destination by, for example, sending active probes to the destination and then waiting for the response. Although peering connections are often unreachable, it is possible for active probes to succeed since some providers may not effectively filter traffic at a peering point and instead rely on an honor-like system to ensure that only traffic to those advertised destinations is received.

Therefore, in the case of peering or private connections, controller 202 must look in the routing table for an advertisement of that destination before moving traffic to a peering connection. Alternatively, a set of reachable destinations can be statically configured for a provider/NSP peer or private link (NSP). Controller 202 can look in the static configuration for reachability information, stored as part of the system configuration. This allows support for public and private connection where routing information may not be dynamically available over private connections.

In an embodiment of the present invention, cost and/or usage control and best performance goals are sought. For example, given a diverse set of cost structures for available transit providers, the overall flow control system cost can be minimized by distributing traffic in a way that takes advantages of the diverse billing structures and yet maintains acceptable performance levels. In another embodiment of the present invention, balancing load or usage across multiple NSPs may be desirable. A model of overall system cost is the minimum cost curve shown below representing peak usage levels for, as an example, three NSPs plotted against the total costs for all three NSPs, A, B, and C in FIG. 8A. Each of NSP A, B, and C may represent different billing contracts with one or more cost tiers and a minimum commitment level. For example, NSP A may have a two-tier billing contract, with $100 per 50 Mbps (minimum commitment) and $50 per 50+Mbps. NSP B may also have a two-tier billing contract, with $125 per 50 Mbps (minimum commitment) and $75 per 50+Mbps. NSP C, in completing the example, may have a two-tier billing contract, with $150 per 50 Mbps and $25 per 50+Mbps. Sample billing profiles will be discussed in greater detail below.

Referring back to FIG. 8A, NSPs A, B, and C are represented by total a total cost curve plotted against peak usage levels. When peak usage is below the sum of all three minimum commitments, the minimum costs remain equal across all tiers. This occurs when NSP usage is prevented from exceeding any single minimum commitment on any NSPs. When this occurs costs remain fixed. Where, for example, all three NSPs are plotted at their minimum cost curves, we can see that total cost remains equal, as shown against a total cost of 2. However, beyond the minimum cost levels, incrementally-rising pricing tiers for each of the three NSPs appear. As shown, NSP A represents the lowest cost tier, NSP B is the next highest cost tier, and NSP C is the last and most expensive cost tier.

Figure 8A:
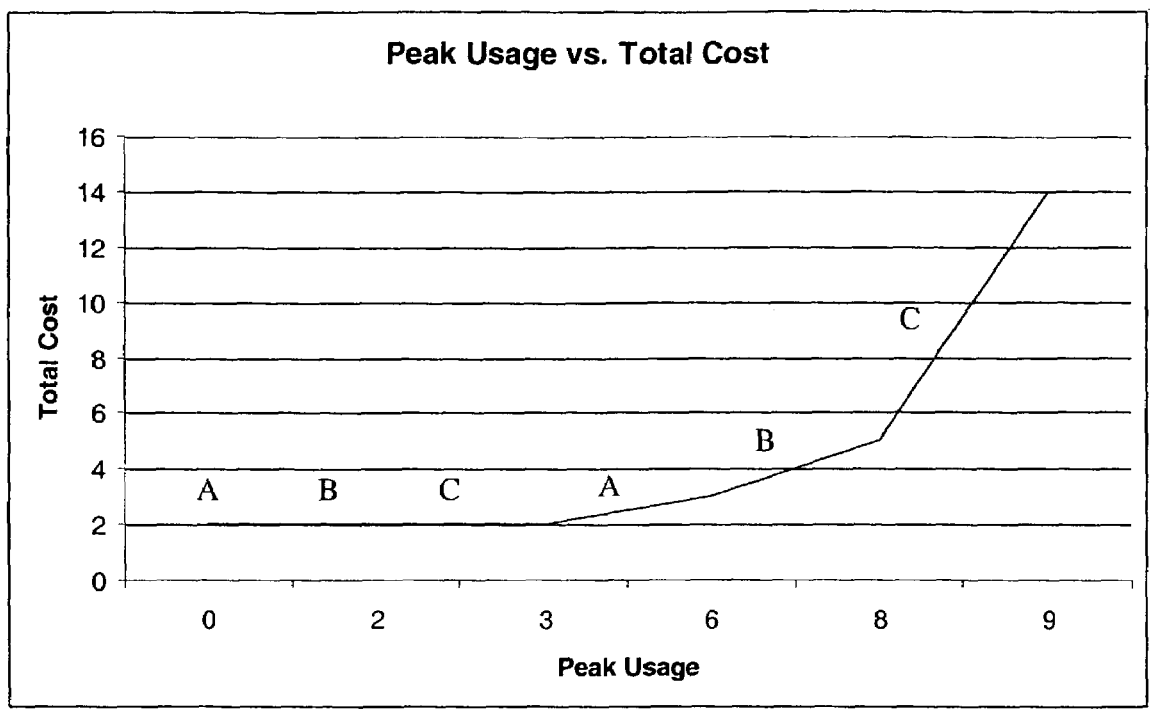
FIGS. 8A-8C are block diagrams of exemplary configuration element receiving a protocol based feed according to different embodiment of the present invention.

The three providers (NSP A, B, and C) have three simple billing profiles. Each NSP has a minimum commitment followed by a burstable tier. The cost/data transfer rate (i.e., Mbps, Gbps) is distinct for each NSP. NSP A has the lowest cost/data transfer rate in the burstable tier, NSP B has the next lowest, and NSP C has the most expensive cost/data transfer rate in the burstable tier. FIG. 8A represents the lowest cost for any given peak usage. Peak usage is coincident with the billable rate at which a customer will be billed at for all NSPs. The curve shows the sum of the minimum commitments as the horizontal line on the left. As data traffic flow usage levels climb above the sum of the minimum commitments, the curve enters one of the burstable tier limits of the individual NSPs A, B, and C, represented by the sloped lines on the right. The slope of the line represents the incremental cost/data transfer rate of the burstable tier. A lower cost/data transfer rate has a lower slope. When the maximum allowed utilization of the provider is consumer, the minimum cost curve climbs into the next incrementally expensive provider. Additionally, this model can be extended to include as many providers/NSPs as required.

Figure 8B:
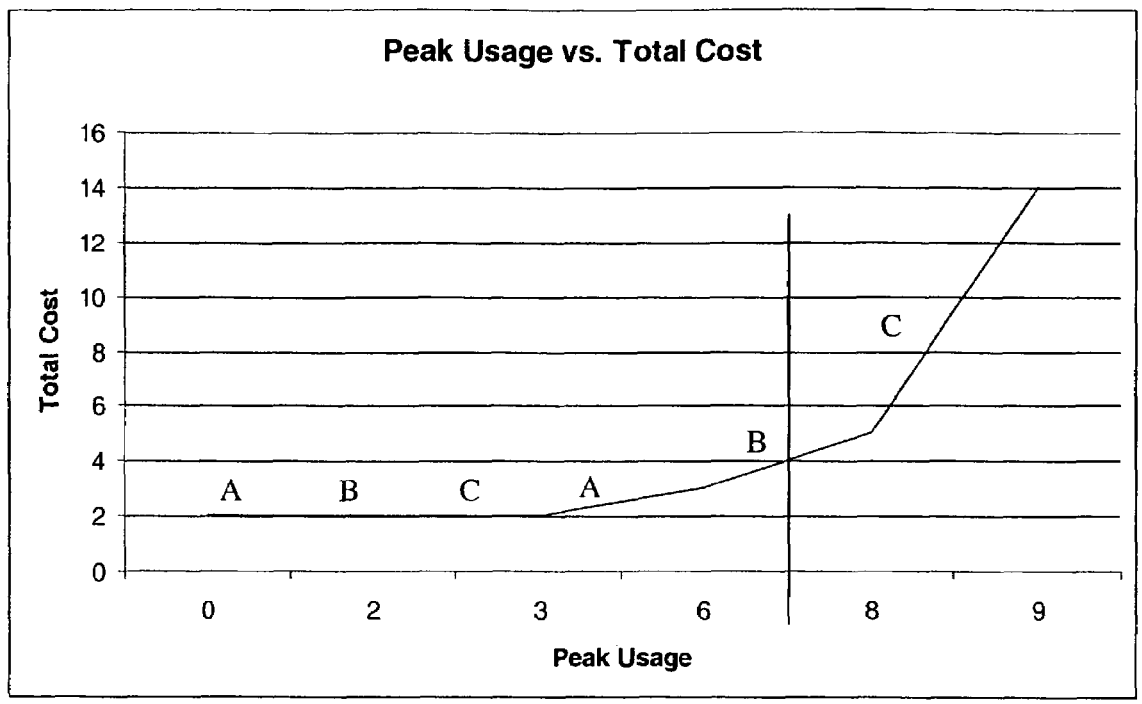

With regard to cost enforcement in accordance with an embodiment of the present invention, the maximum usage levels on each provider can be determined from the minimum cost curve as shown in FIG. 8B, shown for a peak usage of 7 (i.e., 7 Mbps).

In the graph as shown, the minimum commitment level should be enforced for NSP C, the maximum utilization should be enforced on NSP A, while an intermediate level between the minimum commitment and the maximum utilization should be enforced on NSP B. From the graph, a representation of the level that should be enforced per each NSP as 3 volume profiles as shown in FIG. 10.

Figure 10:
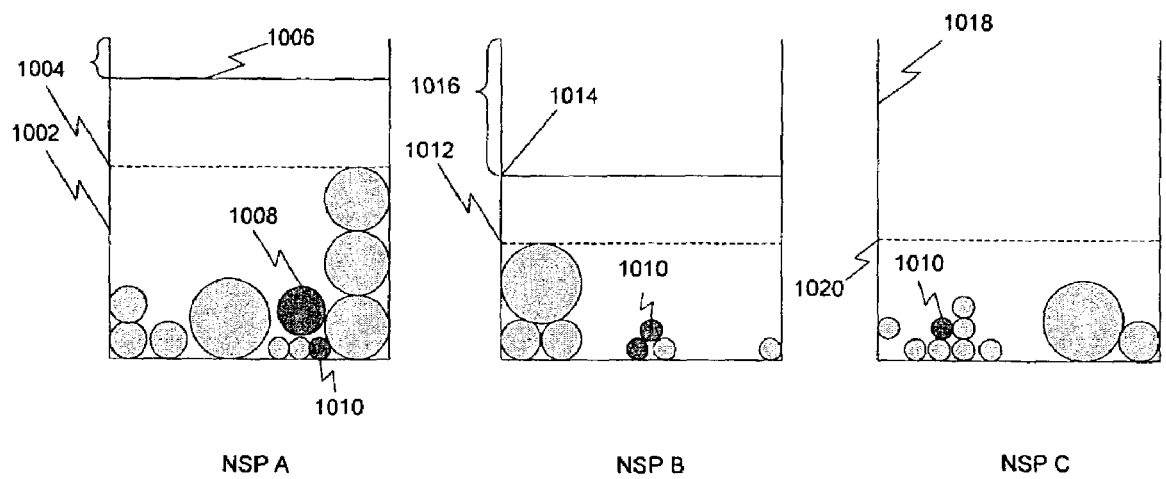
FIG. 10 illustrates three exemplary billing profiles in accordance with one embodiment of the invention.

The volume profiles shown below in FIG. 10 illustrate the usage thresholds for each NSP. Maximum allowable utilization (e.g., do not exceed 90% circuit utilization) is user-configurable and easily seen on NSP A, as described below, where minimum cost would place NSP A at 100% utilization apart from this mechanism. The levels indicated in the figures are relevant at peak usage. Below any peak usage, the flow control system 200 and controller 202 are able to act independently with respect to cost and should optimize based upon performance.

In FIG. 8C, cost is again plotted against usage, revealing a similar cost curve to that plotted in FIGS. 8A and 8B. The model, hereinafter referred to as the cost-usage model, acts as a guide in determining bandwidth allocation across different NSP egresses, in accordance with one embodiment of the present invention. If the 95$^{th}$ percentile of bandwidth allocation (known as P95) is known for a particular billing period (e.g., month), as well as associated factors such as P95 billing rates for individual NSPs, it is possible to project estimated information related to cost, performance, and routing control. P95 is an important metric as it represents the value at which NSPs can assess billing rates, generally disregarding above P95 as aberrant. For example, if P95 or other billable rates are known for all NSPs in a particular billing period, then bandwidth can be allocated so as to adhere to or come close to along the least cost curve shown in FIG. 8C.

The least cost curve is derived from the billing profiles of the different egress providers. As an example, each egress has 2 price tiers, the first of which is a fixed cost, fixed bandwidth or minimum commitment tier. The second price tier has a marginal cost for additional P95 bandwidth. For the flow control system relevant to the embodiment shown in FIG. 8C, there are 6 total tiers. In order of marginal cost, the total tiers might be:

| Tier | Cost |
| --- | --- |
| A1 | 0.00 |
| B1 | 0.00 |
| C1 | 0.00 |
| A2 | 1.00 |
| B2 | 2.00 |
| C2 | 3.00 |

Figure 8C:
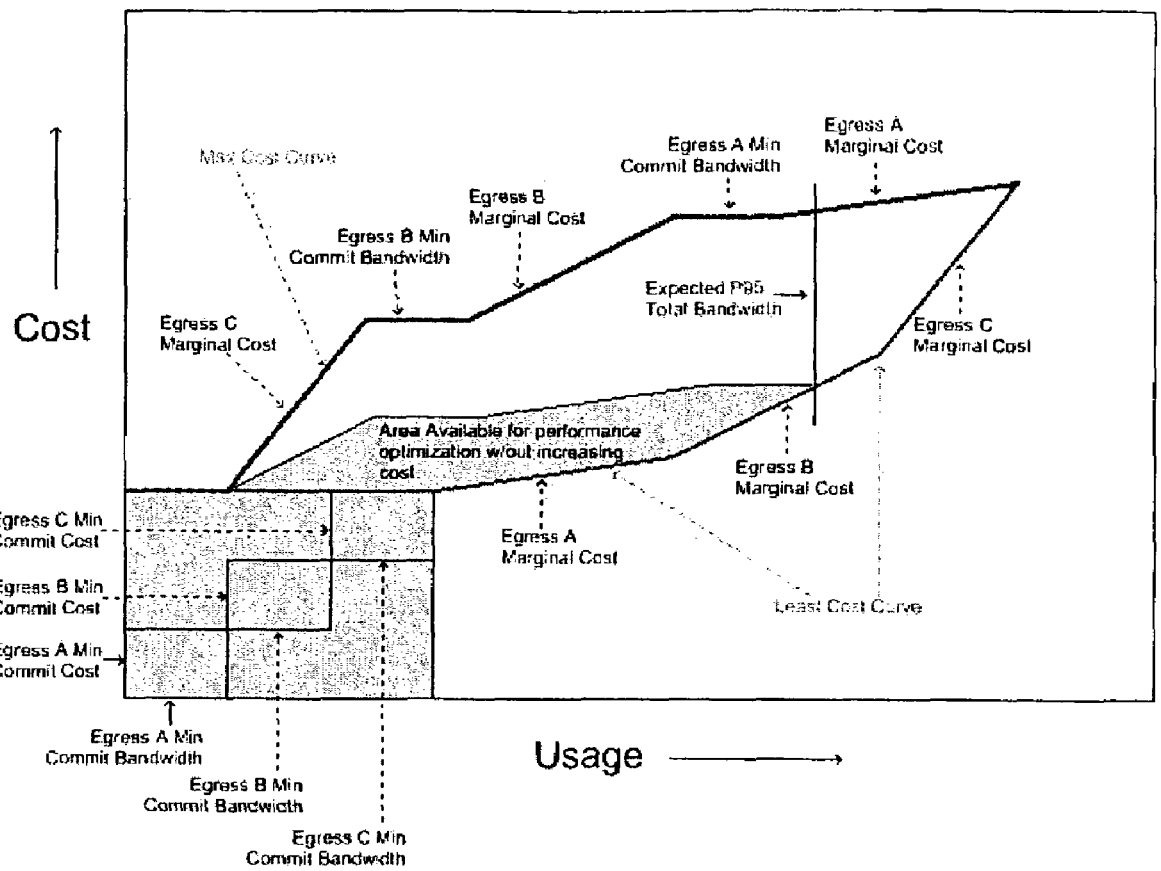

If precise usage samples are known for a particular billing period, P95 bandwidth for the sum of NSP bandwidths can be derived. This derived P95 total NSP bandwidth (total NSP bandwidth is used to distinguish individual NSP bandwidth from the sum of bandwidth across all egresses) as the bandwidth that determine how to distribute traffic across different NSPs. Referring to FIG. 8C's expected P95 line, it is apparent that it crosses the least cost curve in cost tier B2. Thus, the ideal allocation of bandwidth for cost reasons would be:

| | Available for Use | |
| --- | --- | --- |
| NSP A: | 100% Tier A1 + | 100% Tier A2 |
| NSP B: | 100% Tier B1 + | 70% Tier B2 |
| NSP C: | 100% Tier C1 + | 0% Tier C2 |

If the P95 total NSP bandwidth is below the sum of the output bandwidths of the minimum commitment tiers (A1+B1+C1), then the table would appear as:

| | Available for Use | |
| --- | --- | --- |
| Egress A: | 100% Tier A1 + | 0% Tier A2 |
| Egress B: | 100% Tier B1 + | 0% Tier B2 |
| Egress C: | 100% Tier C1 + | 0% Tier C2 |

If the current total bandwidth is above the expected P95 total bandwidth, then bandwidth allocations are computed along the Least Cost Curve provided current total bandwidth remains above the expected P95 point. The cost usage model/algorithm then addresses the decision, if costs are optimized, whether, in light of marginal ability for performance optimization, the controller should swap prefixes between NSPs. In conventional data route control techniques, particularly where BGP is used, a "worst case" scenario tends to evolve. In other words, BGP tends to distribute data traffic flow so as to follow the shortest path, and not necessarily the best performing/lowest cost path available. Often, the best path selected by BGP is an overly-expensive tier one NSP.

Unlike the above-discussed embodiment of the present invention, BGP can select the most expensive path, simply because it is the shortest path, and thus significantly reduce the efficiency of data routing for a multi-homed organization with regard to cost. Disregarding any analysis of P95 bandwidth allocations, neither cost nor performance information is taken into account by BGP when allocating bandwidth among numerous providers. Additionally, BGP also fails to adjust data traffic allocations, even when a significant degradation to either cost or performance appears. Ultimately, an exemplary cost curve for BGP-based route control follows the maximum cost curve in FIG. 8C, instead of the least cost curve.

As for computing bandwidth (as indicated at 7 on FIG. 8B), there are four methods that can be used to predict what P95 (or another percentage total bandwidth, e.g., P87, P91, P70, etc.) total bandwidth will be at the end of a billing period:

1. LAST_N_WEEKS/LAST_N-DAYS/LAST_N_HOURS

This method computes the P95 of the total usage for the past N days/weeks/hours and uses this as the estimated P95 for the current month.

2. MIN_MONTH_SO_FAR

This method only uses usage data from the current calendar month to compute the P95 estimate. If the number of samples are known that will be discarded at the end of the month to compute the actual P95 (e.g., 432 samples for a 30 day month with a 5 minute sample interval). MIN_MONTH_SO_FAR discards this number of samples from usage data received so far for the current month to compute P95.

3. PREVIOUS_MONTH

This method uses a fraction of the previous month's P95 as the estimate for this month's P95.

4. COMBINATION

This method takes the maximum of the three methods listed above.

The above discussion and embodiment relates to outgoing bandwidth allocations. However, this discussion is not intended to limit the invention and other embodiments of the present invention can address input traffic bandwidth allocations. Where NSPs bill based on input bandwidth, output bandwidth, max (input bw, output bw), or sum (input bw, output bw), the bandwidth allocation scheme can be improved with a richer filling method. The richer filling method is accomplished by using P95 bandwidth (or P other estimate, e.g., 87%, 80%, etc.) estimate of the input bandwidth to fill the egresses first. The egresses are filled using the P95 (or other percentile) input bandwidth estimate first because there is no immediate control over the input path. The rules governing the richer filling method, as an example for in-bound traffic, are:

1. If the NSP charges only on input bandwidth, then the entire output egress bandwidth has a marginal cost of $0.00. The NSP can be filled to capacity with outgoing bandwidth.
2. If the NSP charges on output bandwidth, then the input bandwidth input estimate is not used.
3. If the NSP charges using the maximum of input and output bandwidth, then the marginal cost of the output bandwidth below and up to the same bandwidth as input bandwidth is $0.00. Therefore, the NSP can be filled to match the input bandwidth without incurring additional cost.
4. If the NSP charges using the sum of input and output bandwidth, then the tiers are filled for doing the allocation computation first with the input bandwidth. The standard allocation above is then done with the output bandwidth, filling from the cheapest tiers to the most expensive tiers.

As an example of an outbound traffic richer filling method, the above-rules would be conversely modified, for example, as:

1. If the NSP charges only on output bandwidth, then the entire input NSP bandwidth has a marginal cost of $0.00. The NSP can be filled to capacity with incoming bandwidth.
2. If the NSP charges on input bandwidth, then the output bandwidth output estimate is not used.
3. If the NSP charges using the maximum of input and output bandwidth, then the marginal cost of the input bandwidth below and up to the same bandwidth as output bandwidth is $0.00. Therefore, the NSP can be filled to match the output bandwidth without incurring additional cost.
4. If the NSP charges using the sum of input and output bandwidth, then the tiers are filled for doing the allocation computation first with the output bandwidth. The standard allocation above is then done with the input bandwidth, filling from the cheapest tiers to the most expensive tiers.

Richer filling is required when configuration element 208 (e.g., BGPd) is only able to optimize either inbound or outbound usage. For example, in accordance with one embodiment of the present invention, BGP can only affect outbound usage per destination. This requires richer filling techniques for inbound when inbound is considered in the billing profile (e.g., max (in, out)). Some embodiments of SPRE or other NAI-based configuration elements can only affect in-bound usage per destination. This requires richer filling for outbound when outbound usage is considered in the billing profile (e.g., sum (in, out)). If configuration element 208 can affect both inbound and outbound usage, then no rich filling technique is required.

As in FIGS. 8A and 8B, three separate NSPs, A, B, and C are shown. The marginal cost curve reflects the marginal costs for NSP A, NSP B, and NSP C. The area underneath the minimum cost curve, represented by the shaded box in the lower left corner of FIG. 8C, reflects the minimum bandwidth commitment costs for each of NSP A, NSP B, and NSP C. Corresponding costs are associated with the cost of transiting data traffic flow 218 across the egress to each NSP (e.g., an egress router, server, or other implementation for permitting data traffic flow 218 to transit the NSP's respective AS). For varying levels of data traffic, associated costs can be determined from the areas shown beneath the minimum and marginal cost curves for each of NSP A, NSP B, and NSP C. In addition to the least cost curve for NSP A, NSP B, and NSP C there is also a maximum cost curve. In the shaded area between the maximum cost and the least cost curve is the definable target area which is suitable for optimization by controller 202 to improve efficiency without creating an associated increase in cost. The non-shaded area between the maximum cost curve and the least cost curve represent areas of optimization which will increase costs, e.g., creating a performance exception to permit usage thresholds to be exceeded in order to support policy compliance in a more expensive bandwidth tier by another NSP.

Figure 9:
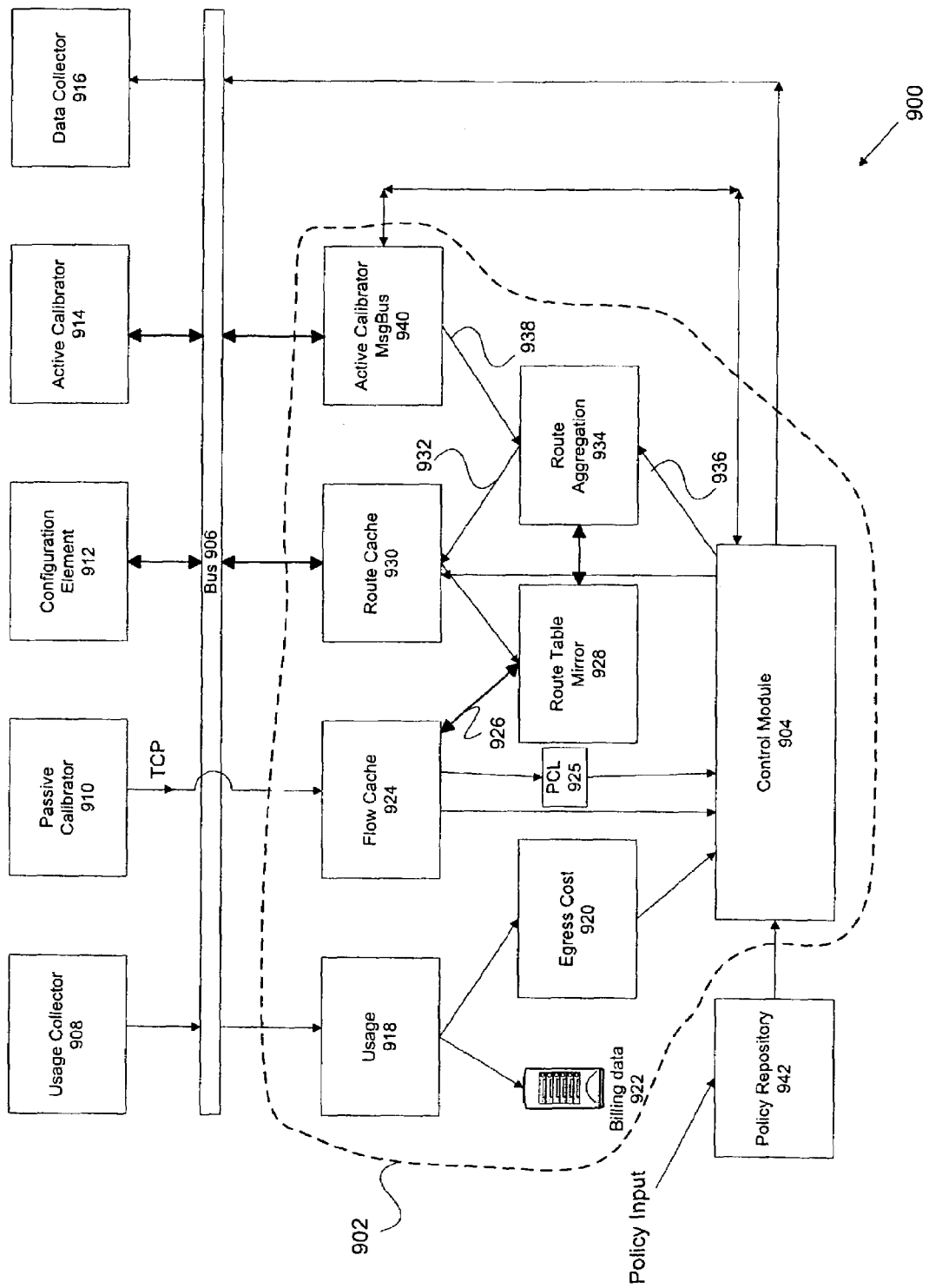
FIG. 9 is a block diagram of an exemplary controller in accordance with another embodiment of the invention.

Referring to FIG. 9, an architectural view of a flow control system 900 is shown. In one embodiment of the present invention, controller 902 is analogous to controller 202 of FIG. 2. There are several key modules that are responsible for serving as the interface between the control module 904 and other data, policy, or other inputs with the flow control system 900, which uses a bus 906 (e.g., a software bus) for enabling communication between modules. Usage collector 908, passive calibrator 910, configuration element 912, active calibrator 914, and data collector 916 are shown in communication using bus 904. Data sent by control module 904 to data collector 916 can be stored in traffic repository 216 (FIG. 2). Usage collector 908, via bus 904, is providing usage data to usage information receiving module 918. Communicating usage data to egress cost module 920, usage information receiving module 918 also communicates usage data for storage in billing data repository 922. Usage data can enable two types of operating parameters, in terms of usage. The first type is estimating usage parameters where no historical information exists. Ideally, the second type, historical parameters, requires at least two billing periods of information in order to enable the generation of effective usage information for use as criteria in routing control. In other words, if two billing periods (e.g., two months worth of billing data collected from each NSP) is used to generate usage parameters, controller 902 will use this information/criteria/parameters to control data routing, in accordance with one embodiment of the invention.

Usage data, upon request, can be communicated to control module 904. Flow cache 924 stores current path ID from a lookup in RT Mirror 928 for destinations. Flow performance information is passed to process control module (PCL) 925, which is designed to determine performance violations using SPC, EWMA, static or other methods. If a violation is detected for a destination, a violation flag is set in flow cache 924 and sent to controller 904. With regard to passive calibrator 910, PFA data can be communicated to control module 904 and, via flow cache 924. PFA 914 data is generated on a per-destination basis, e.g., Round Trip Times (RTT), loss, volume, and jitter. Route table mirror 928 is also communicating with route cache 930, which is sending data from the configuration element 912. Data gathered by configuration element 912 can include, but is not limited to, updates, withdraws, and other routing information from external BGP peers, other protocol-based information, and self-generated information, in accordance with one embodiment of the present invention. Although shown as a BGP-enabled device/process in the current embodiment, other embodiments may use protocols known to those skilled in the art and the present invention is not intended to be limited by only the embodiment currently illustrated.

Referring back to FIG. 9, the route cache 930 (or any other protocol-driven message bus) is receiving route aggregation/change data over route change interface 932 from route aggregation module 934. Active calibrator 914 gets convergence point information and populates that in route aggregation module 934. Next hop information is communicated to route aggregation module 934 from RT Mirror 928. When controller 902 sends an update, it is passed through route aggregation module 934 to determine the proper level of aggregation to use, as described above with regard to convergence point information. Route aggregation module 934 determines the appropriate aggregation level advertisement to route cache 930, which communicates with a configuration element 912 (i.e., BGP daemon). Convergence point aggregation logic provides for aggregation of data as it relates to nodes where two or more paths converge (path diversity=0). Where a convergence point is found to exist, active calibrator 914 generates active probes which, in turn, generate responsive data which is sent back to controller 902 for recording in traffic repository 216. Communicating with active calibrator 914, the active calibrator message bus 940 is receiving data gathered from active probing of convergence points.

Information gathered from active calibrator 914 may include, but is not limited to, convergence point analysis information, per prefix/destination information (e.g., RTT, packet/data loss, jitter, error codes, egress IDs, etc.), or any other type of information that embodiments of the present invention may gather. This information may also be communicated to control module 904 in order to enable route control and changes as necessary. Policy repository 942 houses policy, rules, parameters, and other user or system-specified criteria under which controller 902 provides route control. Control module 904 may also use consolidated usage information plus egress cost information from usage module 918 and egress cost module 920, respectively. In doing so, control module 904 is able to determine whether cost violations exist, based upon policy input received from policy repository 942 which, again, may be either user or system-specified.

Further, in accordance with other embodiments, the present invention is not necessarily limited to those modules shown in FIG. 9, but may include fewer or more function modules as one of ordinary skill in the art may deem to be necessary for implementing multiple parameter control of data routing. Further embodiments may also envision integrating two or more modules as shown in FIG. 9 to be a single process or module.

FIG. 10 is an illustration of three NSP volume profiles exemplifying flow volume and performance data. Three NSP volume profiles, NSP A 1002, NSP B 1004, and NSP C 1006 are shown. Shaded spheres, shown in NSP A, B, and C, generally represent in-use bandwidth over a particular NSP to a given destination prefix. The size of the sphere represents relative flow volume going to the destination prefix. Shading may indicate policy or current and/or projected performance. Dotted-outlined spheres represent projected flow characteristics (e.g., volume/performance) over an NSP before a bandwidth re-allocation movement is made. The flows represented in FIGS. 10-13C are exemplary embodiments of the present invention, as it is possible for numerous different flows to be present at a particular moment.

On NSP A 1002, spheres 1008 and 1010 represent performance and cost-constrained bandwidth allocations according to policy priority settings, respectively. Spheres 1008 and 1010, if moved, may incur either additional costs or performance effects as a result of moving between NSPs. However, cost and performance priority policy setting kicks in only when there is a constraint. Performance priority is not allowed to be degraded in order to address cost moves. Instead the movement of other flows will be selected. Likewise, cost priority is not allowed to increase cost to improve performance. In NSP A 1002, a minimum commitment 1004 is shown, with no bandwidth allocation spheres exceeding the minimum commitment 1004. Also shown are a usage threshold 1006 and a maximum allowable utilization which represents the difference between the maximum bandwidth and the usage threshold 1006. For example, with a 100 Mbps provider and maximum utilization of 90%, the maximum allowable utilization would be 100-90 or 10 Mbps. NSP B also shows a minimum commitment 1012, with no bandwidth allocation spheres exceeding the minimum commitment 1012. Also shown are a usage threshold 1014 and a maximum allowable utilization 1016. Also shown in NSP B are cost-constrained bandwidth allocation spheres 1010. Finally, NSP C also shows a minimum commitment 1020, with no bandwidth allocation spheres exceeding the minimum commitment 1020. Although not represented, NSP C 1006 does have a usage threshold, as determined by the model in FIG. 8C. Also shown in NSP C, is a cost-constrained bandwidth allocation sphere 1010.

Spherical bandwidth allocations, some of which are shaded, represent in-use bandwidth for various applications to a destination prefix. In particular, the shading of bandwidth allocation sphere 1008 is performance-constrained and bandwidth allocation sphere 1010 is cost-constrained by policy. The shading of the spheres also represents the relative performance to a historical perspective or baseline. When performance deviates from the perspective an exception, as discussed above, is indicated, representing bandwidth allocations that should be moved due to performance constraints. The constraints are established and placed on each of the bandwidth allocations with regard to policy input and policies stored in the policy repository 942 (FIG. 9).

Figure 11A:
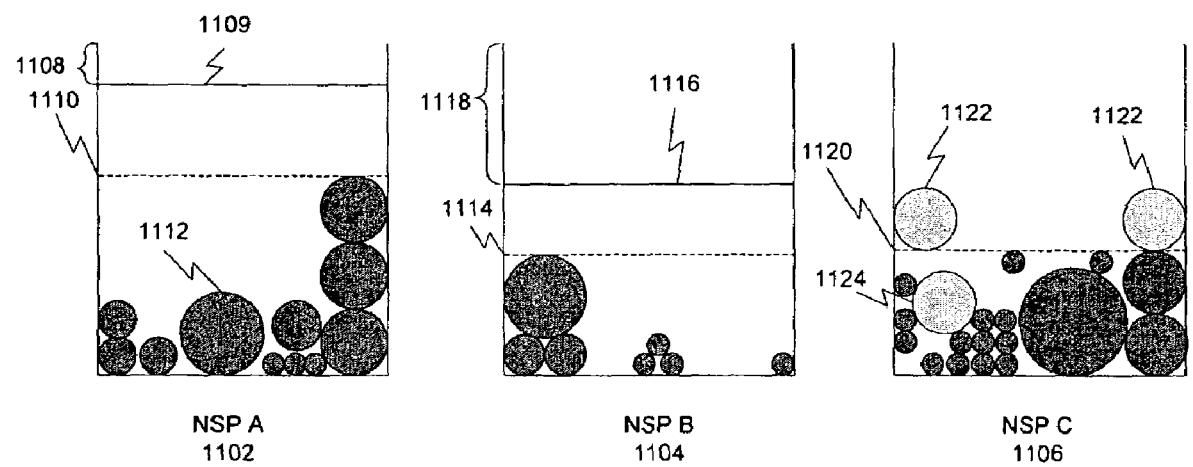
FIG. 11A illustrates three exemplary flow volume/performance profiles, showing aggregated flow information in accordance with one embodiment of the invention.

FIG. 11A is an illustration of three NSP volume profiles exemplifying flow volume and performance data. Three NSP volume profiles, NSP A 1102, NSP B 1104, and NSP C 1106 are shown. On NSP A 1102, a maximum allowable utilization 1108 is shown representing the differential between usage threshold 1109 and the maximum level of NSP A's profile. A minimum commitment level 1110 is shown, beneath which is shaded bandwidth allocation sphere 1112, representing a cost-constrained bandwidth allocations. Sphere 1112, if moved, may incur additional costs as a result of moving between NSPs. NSP B 1104 shows a minimum commitment 1114, with no bandwidth allocation spheres exceeding the minimum commitment 1114. Also shown are usage threshold 1116 and a maximum allowable utilization 1118. NSP C 1106 shows a minimum commitment 1120, with two bandwidth allocation spheres 1122 exceeding the minimum commitment 1120. Also shown are usage threshold 1116 and a maximum allowable utilization 1118. Also shown in NSP C 1106, are lighter shaded spheres 1122 and 1124, lying above and below the minimum commitment 1120 for NSP C 1106, each of which represents cost-constrained bandwidth allocations. According to an embodiment of the present invention, by reallocating sufficient bandwidth, bandwidth spheres 1122, lying above the minimum commitment for NSP C 1106, will fall back below the minimum commitment 1120, thus enabling policy compliance.

Figure 11B:
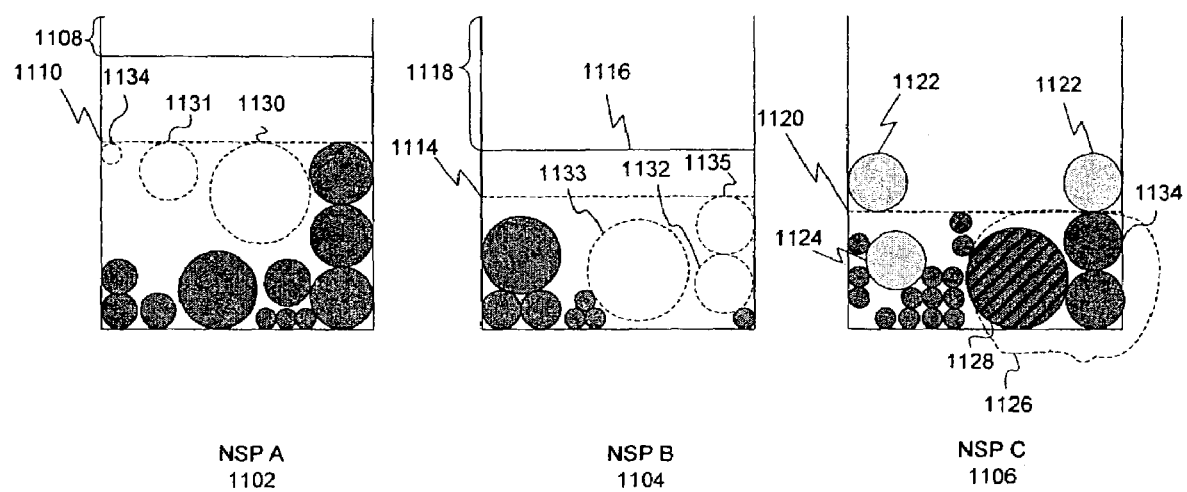
FIG. 11B is a further illustration of three exemplary flow volume/performance buckets for NSP A, NSP B, and NSP C and projected adjustments to allocate aggregated flow information in accordance with one embodiment of the invention.

In terms of cost constraints, FIG. 11B further illustrates selected bandwidth allocations, shown in a circle 1126. Within selected bandwidth allocations 1126 is cost-constrained bandwidth allocation sphere 1128 (striped and darkly shaded). Potential re-allocation positions are shown by bandwidth outlines 1130 and 1132. If moved to either NSP A 1102 or NSP B 1104, cost-constraining policies will not be implemented and the move will be permissible. However, a performance-constrained, but not cost-constrained sphere 1134 also exists as a selected bandwidth allocation (darkly shaded and solid). If moved to NSP A 1102, projected bandwidth allocation 1134 will become performance constrained. When that happens the volume and throughput to that prefix decreases and thus restricts the flow of what may be mission critical application data.

Figure 11C:
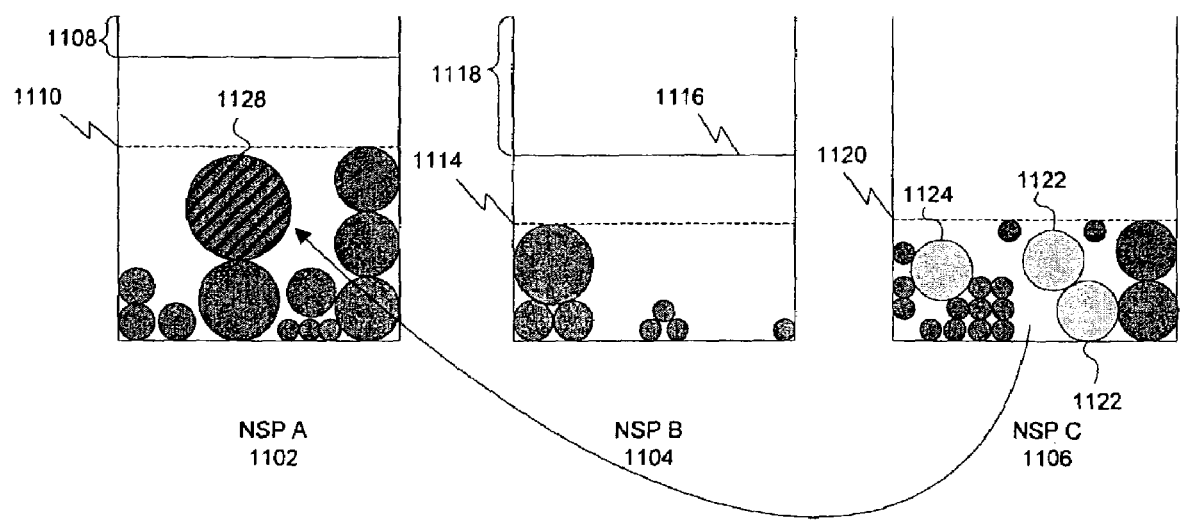
FIG. 11C is an illustration of aggregated flow information for an allocation in accordance with a specific embodiment of the invention.

In FIG. 11C, bandwidth allocation 1128 has been changed to NSP A 1102 and cost policy-violating spheres 1122 have moved below NSP C 1106 minimum commitment 1120. An embodiment of the present invention, in moving these spheres, has enabled policy compliance, without creating either a performance exception or violation.

In another example illustrated in FIG. 12A, again three volume thresholds are shown. All three NSP bandwidth allocations are below usage thresholds 1209, 1214, and not labeled in NSP C. However, bandwidth allocation in NSP B 1204 and 1206 are completely filled. Lighter shaded bandwidth allocation spheres 1220 and 1222 exist in NSP A 1202 and NSP C 1206, representing performance violations.

Figure 12A:
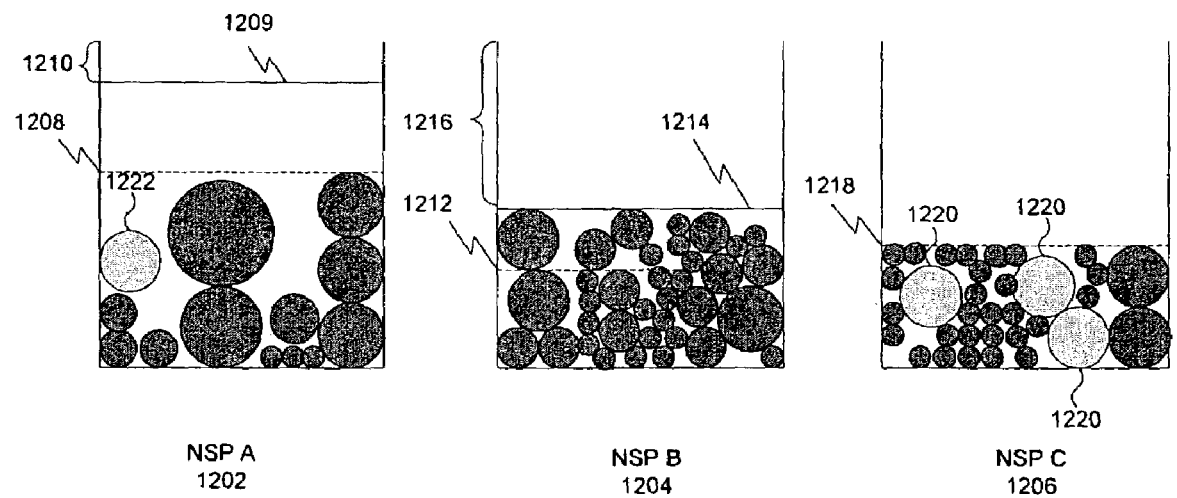
FIG. 12A illustrates exemplary three billing profiles with bandwidth allocations below maximum bandwidth allocations among three different pricing tiers in accordance with one embodiment of the invention.
Figure 12B:
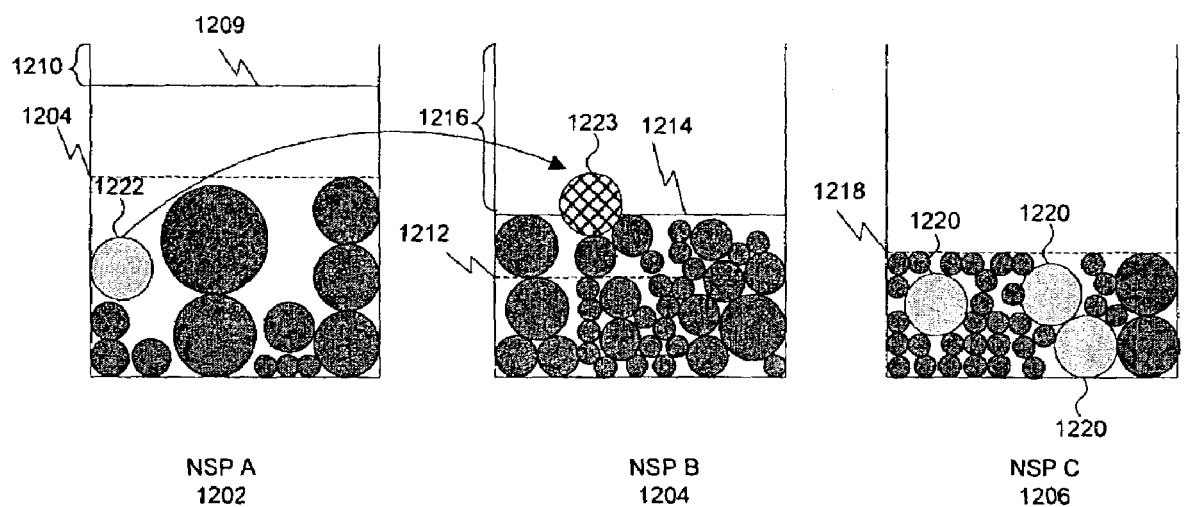
FIG. 12B illustrates an example of a projected allocation of aggregated flow information between three network service providers, NSP A, NSP B, and NSP C in accordance with one embodiment of the invention.

In FIG. 12B, a projected shift of bandwidth allocation 1222 to NSP B creates a cost violation in that sphere 1223 now exceeds usage threshold 1214 for NSP B 1204. In order to correct the cost violation, bandwidth must be shifted to bring sphere 1223 below the usage threshold 1214.

Figure 12C:
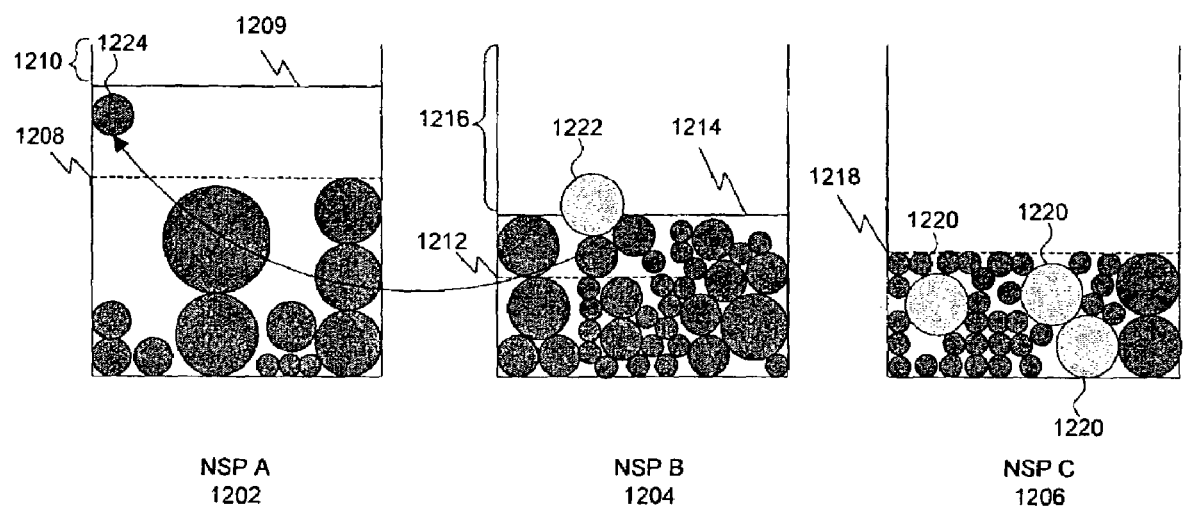
FIG. 12C illustrates exemplary three billing profiles with projected bandwidth allocations and a second projected bandwidth allocation in accordance with one embodiment of the invention.

As shown in FIG. 12A, prefix spheres 1220 and 1222 are performance violations, but there is no available re-allocation space in either NSP B or NSP C for moving the spheres. In FIG. 12B, in-use bandwidth sphere 1222 can be re-allocated to NSP B. By allowing sphere 1222 to move to NSP B, as shown by cross-hatched sphere 1223, the performance violation is fixed, but this creates a cost violation on NSP B, having exceeded usage threshold 1214. As shown in FIG. 12C, to address the cost violation, prefix 1224 is discovered to have equal or better performance on NSP A, and a move is made to sphere 1224. NSP A has bandwidth available since current usage even with sphere 1224 added, is still below usage threshold 1209, as determined by the usage cost model discussed in FIG. 8C.

Figure 13A:
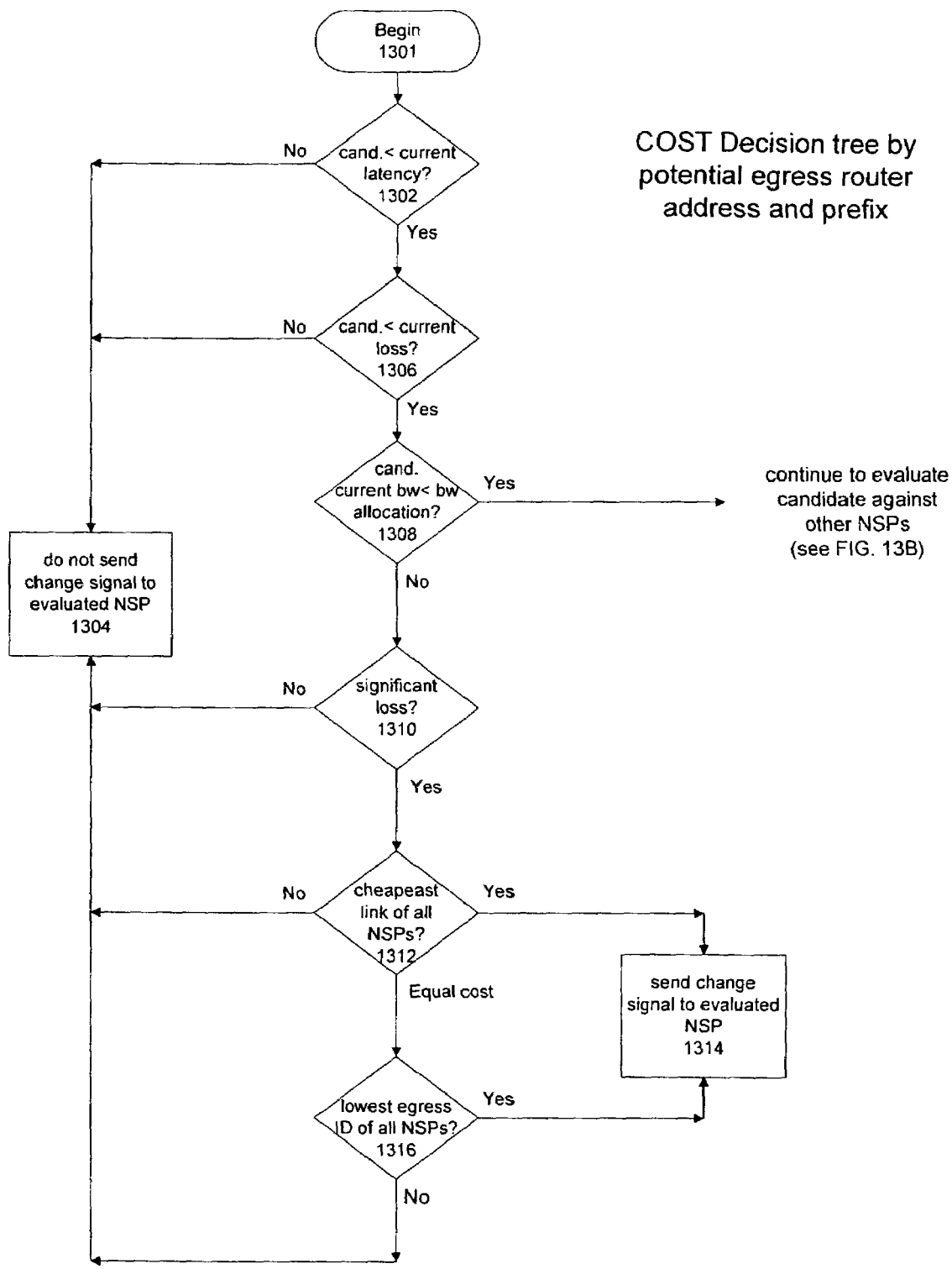
FIG. 13A is a flow chart for an exemplary method of data network control in accordance with one embodiment of the invention.
Figure 13B:
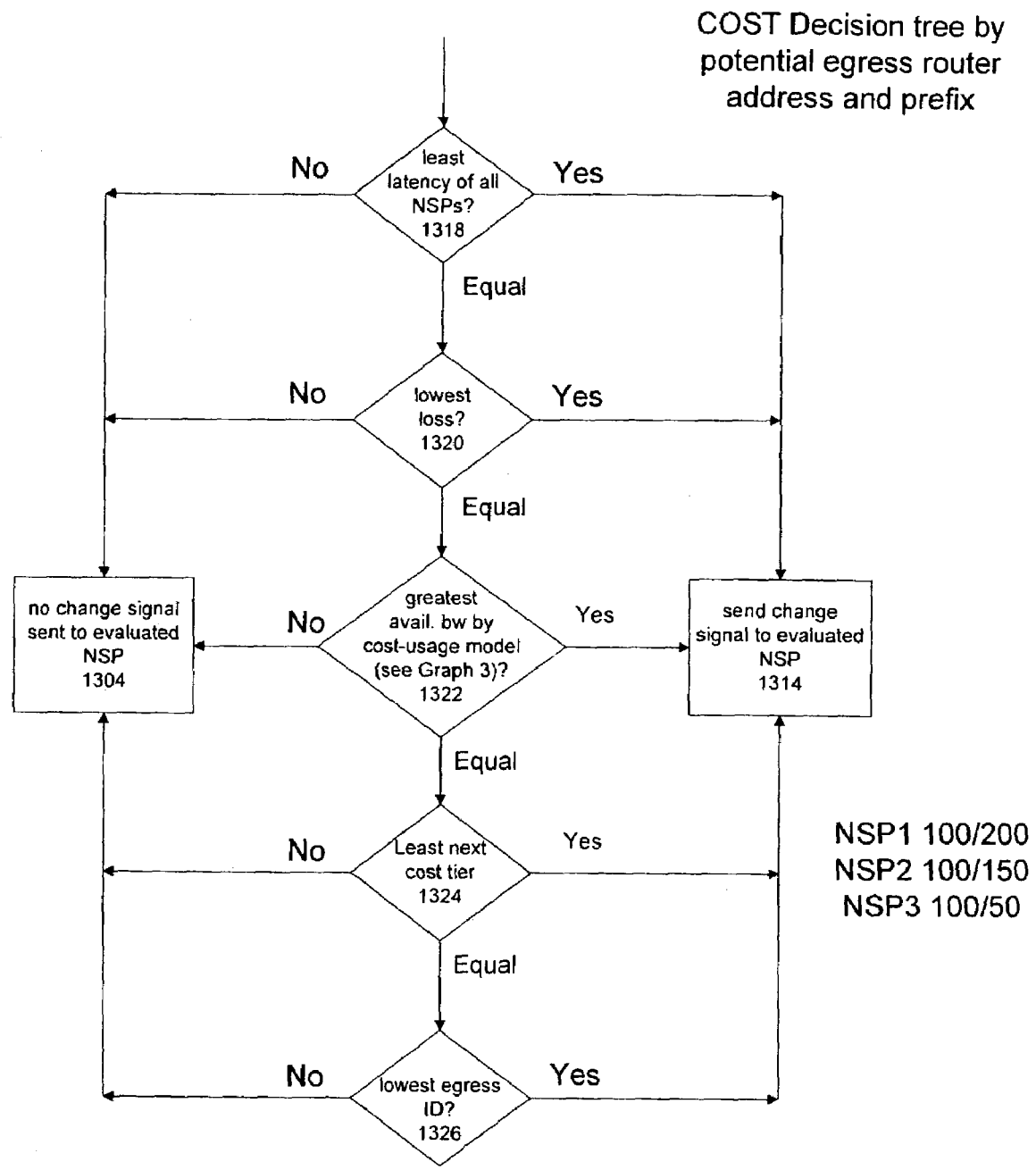
FIG. 13B is a flow chart as a continuation of FIG. 13A in accordance with one embodiment of the invention.
Figure 13C:
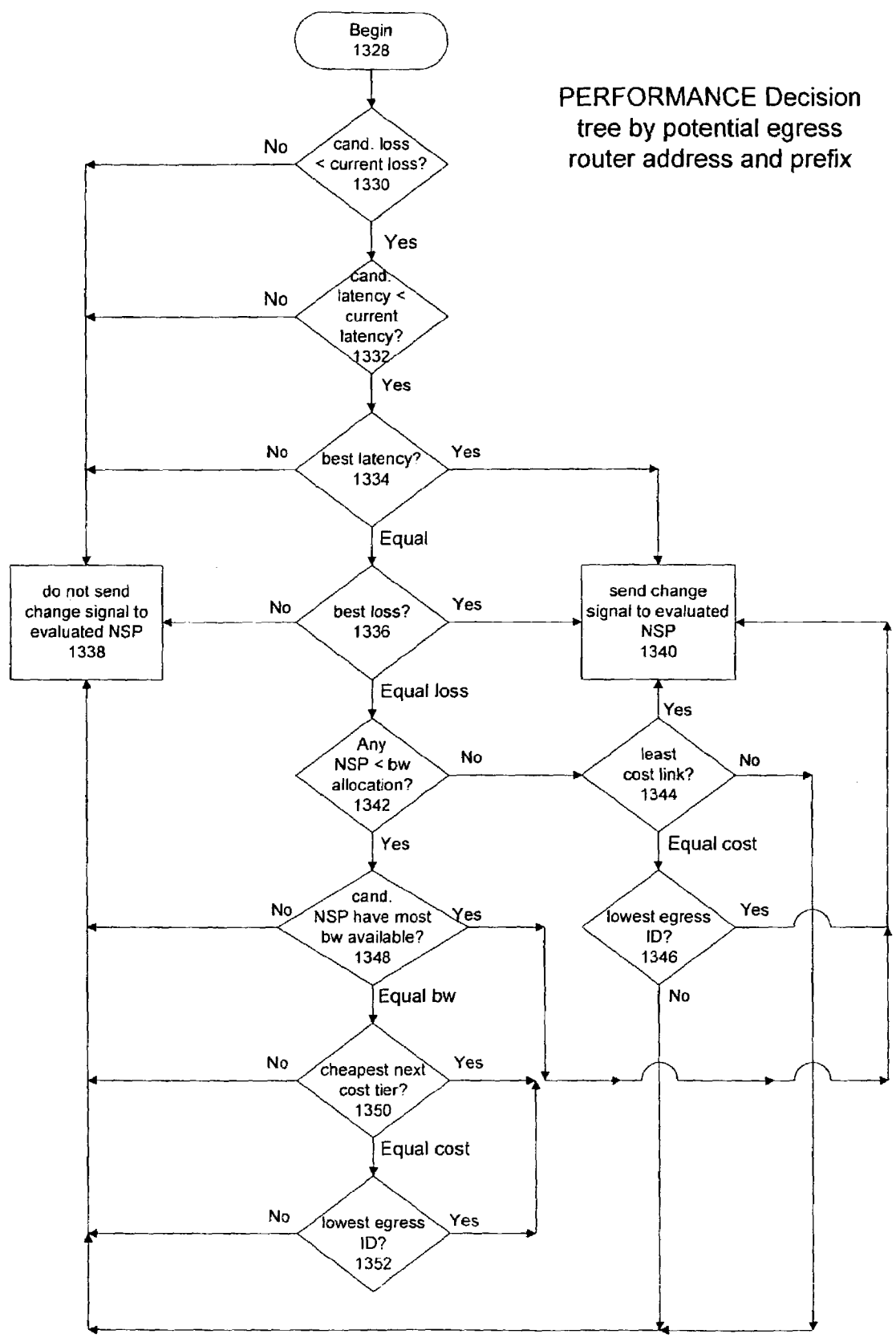
FIG. 13C is a flow chart for another exemplary method of data network control in accordance with one embodiment of the invention.

FIGS. 13A, 13B, and 13C illustrate the controller logic flow for moving a prefix, in accordance with one embodiment of the invention. The process, started at step 1301, evaluates all candidate NSPs against one another in order to determine the best performing path for data routing for a prefix. Controller 202 (FIG. 2) evaluates each available NSP in parallel, comparing performance characteristics and statistics against stored cost and performance parameters/characteristics, housed in a-data repository.

In step 1302, controller 202 evaluates current latency for a destination address or prefix between the evaluated candidate NSP (e.g., egress router) and a destination address or prefix. If controller 202 determines that current latency is less than latency available via the candidate NSP, then no change signal is sent to the evaluated NSP. However, if current data transmission latency at egress exceeds latency available via candidate NSP, controller 202 then evaluates candidate and current loss in step 1306. If candidate loss is less than current loss, then controller 202 determines whether candidate's current bandwidth allocation is less than the total bandwidth allocation. If so, then the candidate evaluation continues, as discussed with regard to FIG. 13B below. If candidate current bandwidth is not less than total bandwidth allocation, then controller 202 assesses whether there is significant loss on the current NSP. If no significant loss exists among all NSPs, then no change signal is sent to the evaluated NSP as in step 1304. However, if significant loss exists, controller 202 goes on to step 1312 to determine whether the NSP is the cheapest NSP of all evaluated NSPs. If not, then controller 202 will not send a change signal to the evaluated NSP. If it is, then controller 202 will send a change signal to the evaluated NSP. If the cost of the evaluated NSP is equal to another candidate NSP, then controller will determine, from the equal cost NSPs, which has the lowest egress ID (generally, an arbitrarily assigned system administration ID) and select that NSP, as in step 1316.

If, in step 1308, the current candidate bandwidth allocation is less than the total bandwidth allocation for the candidate (according to the cost-usage model), then controller 202 evaluates the candidate NSP against all other candidate NSPs. In FIG. 13B, controller 202 determines of all NSPs, which one has the least latency as shown in step 1318. If the candidate NSP has the lowest latency, a change signal is sent to the evaluated NSP. If the candidate NSP does not have the lowest latency, a change signal is not sent to the evaluated NSP. However, if the latency is equal (within the range defined by UCL/LCL), then controller 202 determines whether the candidate NSP has the lowest loss among all the NSPs in step 1320. If the loss of the candidate is lowest and equal to another NSP, controller 202 logic proceeds to step 1322 to determine, of all candidate NSPs, which NSP has the greatest available bandwidth, in accordance with the cost-usage model discussed above in FIG. 8C and current usage.

If the candidate NSP does not have the greatest available bandwidth, then no change signal is sent to the evaluated NSP. If the candidate NPS does have the greatest available bandwidth, then a change signal is sent to the evaluated NSP. If the available bandwidth at the evaluated NSP is equal to another candidate NSP, then controller 202 must determine the next least cost tier in step 1324. In this step, controller 202 must determine which of the equal NSPs resulting from step 1322 has the lowest next cost tier and subsequently, direct a change to that NSP. If the resulting candidate NSPs from step 1322 is in the same next cost tier, then, in step 1326, the NSP with the lowest egress ID will be chosen and controller 202 will send a change signal directing data flow to the candidate NSP.

Similarly for performance criteria, controller 202 logic will execute the flow chart as shown in FIG. 13C. In step 1330, candidate loss is compared against current loss, measured (as in the cost flow process of FIGS. 13A and 13B) at the potential egress for each destination/prefix. If the candidate loss is not less than current loss, then no change signal is sent to the evaluated NSP, as in step 1338. If candidate loss is less than current loss, then the evaluated NSP is assessed as to whether its latency is less than the current latency as in step 1332. If not, again, no change signal is sent to the evaluated NSP. If the latency at the candidate NSP potential egress is less than the current latency, then controller 202 must determine whether the evaluated NSP has the best latency among all candidates, as shown in step 1334. If not, then no change signal is sent. If the evaluated NSP does have the best latency (meaning the lowest latency), then a change signal is sent to the evaluated NSP as shown in step 1340. In the event that the evaluated NSP's latency is equal to another candidate NSP's latency, then controller 202 determines whether the candidate has the best loss, in step 1306. Thereafter, controller 202 determines if any candidate NSP has available bandwidth. In other words, controller 202 determines whether another candidate NSP has available bandwidth which is less than the bandwidth allocation specified as policy.

In step 1342, if any NSP has available bandwidth, then controller 202 determines, in step 1344 whether the candidate is the least cost link. If the candidate NSP is the least cost NSP, then a change signal is sent to the evaluated NSP. If not, then no change signal is sent to the evaluated NSP. If the cost is equal between the candidate NSP and other candidate NSPs, then controller 202 assesses whether the candidate NSP is the lowest egress ID, as shown in step 1346. If not, then no change signal is sent. If so, then a change signal is sent.

Referring back to step 1342, if no candidate NSP has bandwidth available, then controller determines whether the candidate NSP has the most bandwidth available in step 1348. If so, then a change signal is sent to the evaluated NSP. If not, then no change signal is sent. However, if the available bandwidth of the candidate NSP is equal to another candidate NSP, then controller determines whether the candidate falls within the next cheapest cost tier. If so, a move is made to the candidate NSP. If the cost of the candidate NSP is equal to other candidate NSPs, then again, the lowest egress ID assigned will be selected as the best performing NSP. The above-process outlines the method by which, in accordance with one embodiment of the invention, the controller 202 may execute the logic behind best performance path selection. One of ordinary skill in the art, however, may be able to determine alternative steps, processes, sub-processes, or methods by which best performance path selection can be made and the present invention is not intended to be limited to necessarily those steps stated above.

Figure 14:
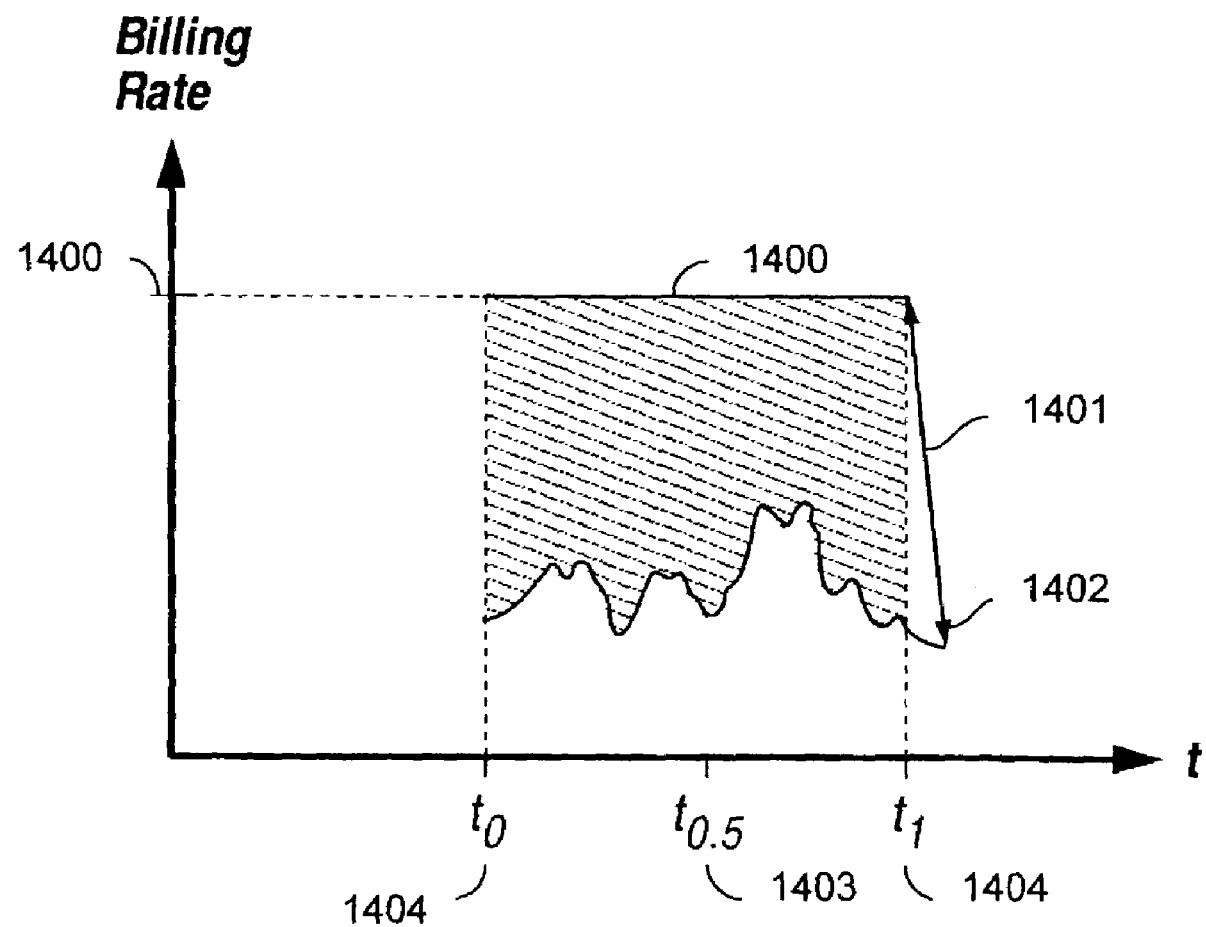
FIG. 14 illustrates the determination of available "free" bandwidth in accordance with an embodiment of the present invention.

FIG. 14 illustrates how the availability of "free" bandwidth is expressed for a given provider and as measured by usage collector 204 of FIG. 2. Over any given time period from t0 though t1, current usage rate 1402 and the current billable rate 1400 is determined. As shown, time point t0.5 1403 represents an over-sampled time point. Difference 1401 between these two values represents an amount of bandwidth available to be used without incurring any additional cost. The free bandwidth per provider can be used to select a subset of compliant providers when a performance-based policy is in violation by the current or default provider. Additionally, this information is used to apply cost- and load-based policies for each provider.

Figure 15:
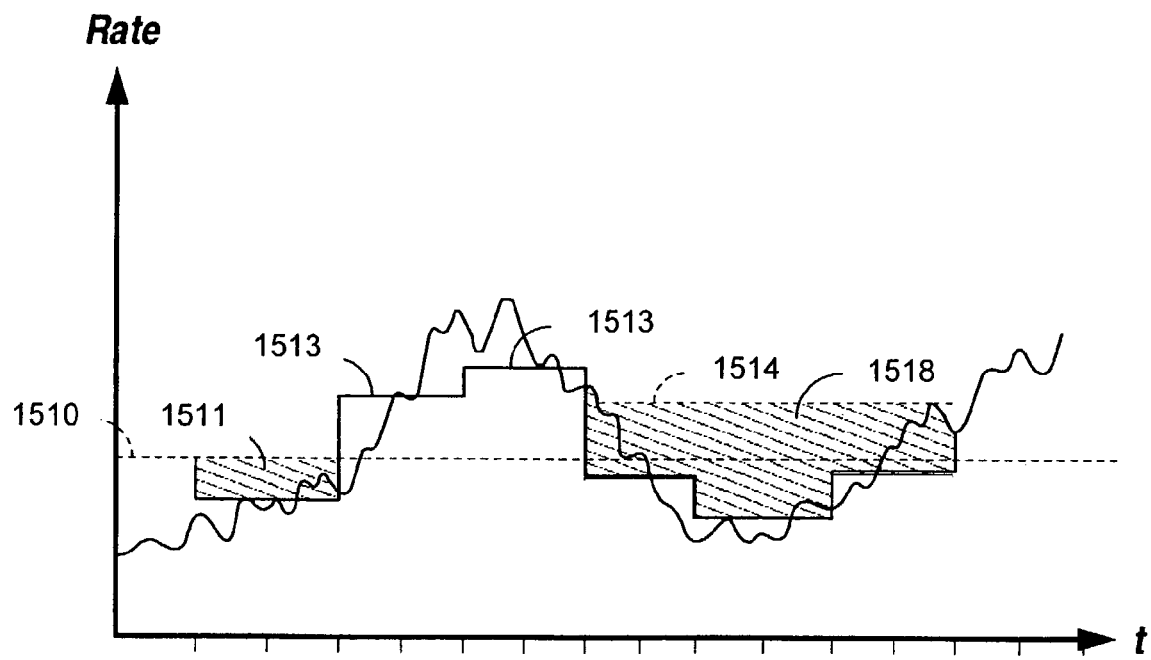
FIG. 15 depicts the calculation of a time continuous billable rate according to an embodiment of the present invention.

FIG. 15 depicts how usage collector 204 calculates the time-continuous billable rate as shown in FIG. 14. Most providers start out with a minimum commitment level 1510. If the current usage starts out below that commitment, the free bandwidth 1511 is shown. Samples are collected at twice the provider sampling rate to ensure that an accurate rate is being calculated (i.e., this is a conservative estimate and if the rate deviates from the provider rate, it will be higher and represent an overestimation of the billable rate). The small tick marks on the time axis represent the samples collected by the system (i.e., over-sampling). When enough samples are collected, the billable rate, which generally is expressed as the $95^{th}$ percentile of all rate samples, may exceed the minimum commitment as shown by successively higher tiers 1513 of the billable rate in FIG. 15. When the traffic drops back down below this rate, a new billable rate 1514 is set and the system again has free bandwidth 1518 available for use.

Figure 16:
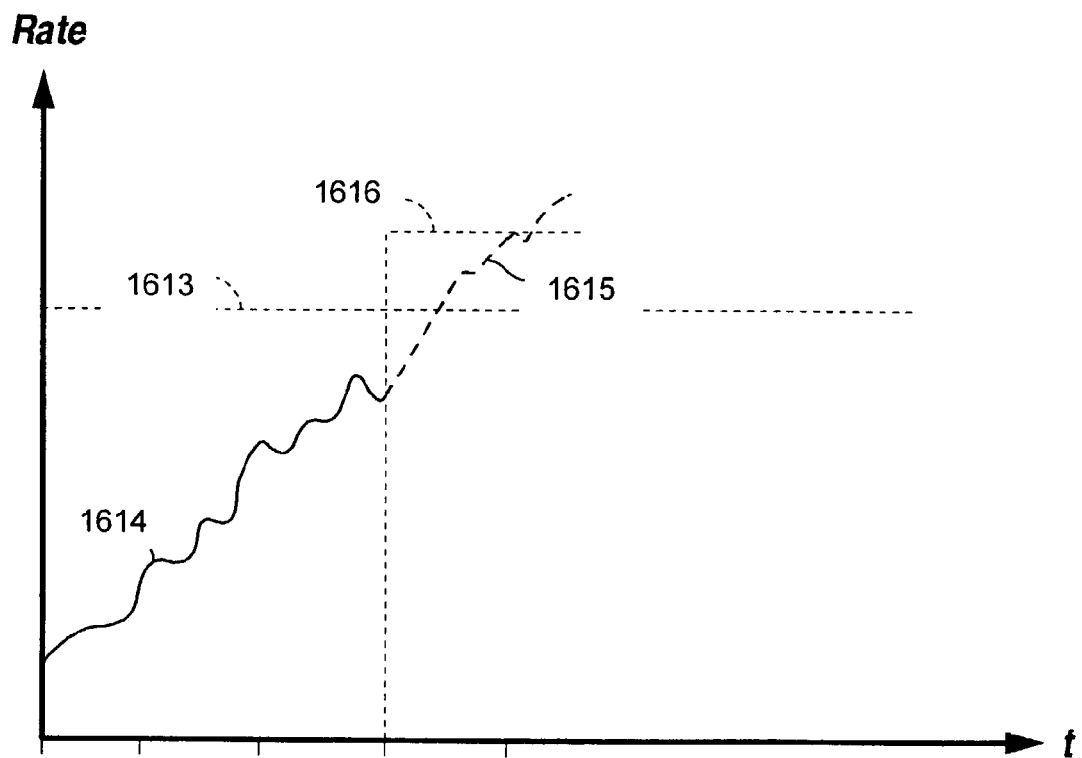
FIG. 16 depicts the detection of a cost-based policy violation in accordance with one embodiment of the invention.

FIG. 16 shows how an exemplary flow control system 200 and controller 202 will detect a cost-based policy violation. Suppose the cost policy requirement is defined to be an absolute threshold, as shown by 1613. This threshold can be an absolute rate or a set dollar amount to spend (which is converted by the system to an average billable rate). On a sample-by-sample basis, the actual traffic rate 1614 should be such that a new billable rate above 1613 is never established. Using short range forecasting techniques, the traffic rate for the next few samples 1615 can be forecasted, and if this forecast predicts that a new billable rate 1616 will be established, controller 202 of FIG. 2 can react by moving traffic off of this provider.

As described, embodiments of the present may send, generate, use, exploit, gather, intercept, receive, manipulate, modify, destroy, or propagate signals to transfer data. The data network 82 (FIG. 1) provides the communication means, such as physical inter connective links comprising copper wire, fiber optic cable, or the like, for transmitting and receiving signals. Similarly, wireless communication means, such as radio waves or the like, are also understood to provide means to transfer information from a source to a destination.

As is well known in the art of network communications, data networks are configured to communicate electrical information, such as a computer data signal comprising data (e.g., binary data bits) superimposed upon a radio or any other carrier wave. A person having ordinary skill in the art would appreciate that a carrier wave is electromagnetic energy propagated from a source by radiation, optical or conduction waves and is suitable for embodying an information-bearing signal, such as a computer data signal. In one embodiment, a carrier wave behaves, or is modulated, according to a network protocol, such as or Ethernet, IEEE 1394, TCP/IP, or any other communication protocol, so as to include computer data information. In some embodiments, the computer data signal includes a computer program for practicing the present invention. The carrier wave can be, for example, a direct current, an alternating current, or a pulse chain. In modulation of the carrier wave, it may be processed in such a way that its amplitude, frequency, or some other property varies so as to embody data for transfer.

Although the present invention has been discussed with respect to specific embodiments, one of ordinary skill in the art will realize that these embodiments are merely illustrative, and not restrictive, of the invention. For example, although the above description describes route control as relating to Internet data, it should be understood that the present invention relates to networks and route control in general and need not be restricted to Internet data and signals, as discussed above. The scope of the invention is to be determined solely by the appended claims.

In the foregoing specification, the invention is described with reference to specific embodiments thereof, but those skilled in the art will recognize that while the invention is not limited thereto. Various features and aspects of the above-described invention may be used individually or jointly. Further, although the invention has been described in the context of its implementation in a particular environment and for particular applications, its usefulness is not limited thereto and it can be utilized in any number of environments and applications without departing from the broader spirit and scope thereof. The specification and drawings are, accordingly, to be regarded as illustrative rather than restrictive.

What is claimed is:

1. A method for controlling a data flow on a network, wherein the network includes a plurality of network service providers (NSPs), the method comprising:
   comparing a candidate loss for a candidate NSP to a current loss for the current NSP, wherein the current NSP is currently used for routing the data flow and the candidate NSP is selected from the remaining ones of the plurality of NSPs;
   comparing a candidate latency for the candidate NSP to a current latency for the current NSP;
   if the candidate loss and the candidate latency for the candidate NSP are better than the current loss and the current latency for the current NSP, then comparing the candidate NSP to the other of the remaining ones of the plurality of NSPs by:
      determining a best latency of the remaining ones of the NSPs;
      determining a best loss of the remaining ones of the NSPs;
      for those remaining ones of the NSPs that have the best latency and the best loss, determining a greatest available bandwidth of the remaining ones of the NSPs;
      for those remaining ones of the NSPs that have the greatest available bandwidth, determining a least next cost tier;
      for those remaining ones of the NSPs that have the least next cost tier, determining a lowest identifier; and
   assigning a change value so that the data flow is moved from the current NSP to the remaining one of the NSPs that has the lowest identifier.

2. An apparatus for controlling a data flow on a network, wherein the network includes a plurality of network service providers (NSPs) and the data flow is currently routed through a current NSP, the apparatus comprising at least one computing device configured to:
   evaluate a candidate latency for a candidate NSP, wherein the candidate NSP is selected from remaining ones of the plurality of NSPs;
   evaluate a candidate loss for the candidate NSP;
   evaluate a candidate bandwidth for the candidate NSP to a bandwidth allocation for the candidate NSP;
   determine a loss value for the remaining ones of the plurality of NSPs;
   determine a cost for the remaining ones of the plurality of NSPs;
   evaluate an identifier for the remaining ones of the plurality of NSPs; and
   determine a change value.

3. The apparatus of claim 2, wherein the at least one computing device is further configured to:
   determine a lowest latency for the remaining ones of the plurality of NSPs if said candidate bandwidth is less than said bandwidth allocation;
   determine a lowest loss for the remaining ones of the plurality of NSPs;
   determine a greatest available bandwidth based on a cost and a usage variable for the remaining ones of the plurality of NSPs;
   determine a cost tier for the remaining ones of the plurality of NSPs;
   determine a lowest identifier for the remaining ones of the plurality of NSPs; and
   assign a change value.

4. An apparatus for controlling a data flow on a network, wherein the network includes a plurality of network service providers (NSPs) and the data flow is currently routed through a current NSP, the apparatus comprising at least one computing device configured to:
   compare a candidate loss for a candidate NSP to a current loss for the current NSP, wherein the candidate NSP is selected from the remaining ones of the plurality of NSPs;
   compare a candidate latency for the candidate NSP to a current latency for the current NSP;
   determine a best latency of the remaining ones of the plurality of NSPs;
   determine a best loss of the remaining ones of the plurality of NSPs;
   evaluate a candidate bandwidth for the candidate NSP;
   determine a maximum candidate bandwidth value for the candidate NSP;
   determine a cost tier for the remaining ones of the plurality of NSPs;
   determine a lowest identifier of the remaining ones of the plurality of NSPs; and
   assign a change value to control routing of the data flow.

5. A computer-readable medium storing instructions for controlling data flow on a network, wherein the network includes a plurality of network service providers (NSPs) and the data flow is currently routed through a current NSP, by performing the steps of:
   evaluating a candidate latency for a candidate NSP, wherein the candidate NSP is selected from remaining ones of the plurality of NSPs;
   evaluating a candidate loss for a candidate NSP;
   comparing a candidate bandwidth for a candidate NSP to a bandwidth allocation for a candidate NSP;
   determining a loss value for at least some of the remaining ones of the plurality of NSPs;
   determining a cost for at least some of the remaining ones of the plurality of NSPs;
   evaluating an identifier for at least some of the remaining ones of the plurality of NSPs; and
   determining a change value.

6. The computer-readable medium of claim 5, further comprising the steps of:

determining a lowest latency for at least some of the remaining ones of the plurality of NSPs if said candidate bandwidth for the candidate NSP is less than said bandwidth allocation for the candidate NSP;

determining a lowest loss for at least some of the remaining ones of the plurality of NSPs;

determining a greatest available bandwidth for at least some of the remaining ones of the plurality of NSPs based on a cost and a usage variable;

determining a cost tier for at least some of the remaining ones of the plurality of NSPs;

determining a lowest identifier for at least some of the remaining ones of the plurality of NSPs;

and assigning a change value.

7. A computer-readable medium storing instructions for controlling a data flow on a network, wherein the network includes a plurality of network service providers (NSPs) and the data flow is currently routed through a current NSP, by performing the steps of:

comparing a candidate loss for a candidate NSP to a current loss for the current NSP, wherein the candidate NSP is selected from remaining ones of the plurality of NSPs;

comparing a candidate latency for the candidate NSP to a current latency for the current NSP;

determining a best latency for the remaining ones of the plurality of NSPs;

determining a best loss for the remaining ones of the plurality of NSPs;

evaluating a candidate bandwidth values for the candidate NSP;

determining a maximum candidate bandwidth value for the candidate NSP;

determining a cost tier for the remaining ones of the plurality of NSPs;

determining a lowest identifier for the remaining ones of the plurality of NSPs; and assigning a change value to control the data flow.

8. A method for distributing data flows between a plurality of network system providers (NSPs), wherein each NSP has a multi-tier cost structure and a minimum commitment level, the method comprising:

providing a data flow on a current NSP;

for a candidate NSP, wherein the candidate NSP is one of the remaining NSPs:

comparing performance data for the current NSP with performance data for the candidate NSP;

if the performance data for the candidate NSP is better than the performance data for the current NSP, then determining whether current bandwidth for the candidate NSP is below bandwidth allocation for the candidate NSP;

if the current bandwidth for the candidate NSP is below the bandwidth allocation for the candidate NSP, then comparing performance data for the candidate NSP with other ones of the remaining NSPs; and comparing cost data for the candidate NSP with other ones of the remaining NSPs; and based on the performance data and cost data comparisons, changing the data flow from the first NSP to one of the remaining NSPs.

9. The method of claim 8, wherein comparing performance data for the current NSP with performance data for the candidate NSP comprises comparing latency data or loss data.

10. The method of claim 8, wherein comparing performance data for the candidate NSP with other ones of the remaining NSPs, comprises comparing latency data or loss data.

11. The method of claim 8, wherein comparing cost data for the candidate NSP with other ones of the remaining NSPs, comprises comparing a cost for the minimum commitment level for the candidate NSP with a cost for the minimum commitment levels for the other ones of the remaining NSPs.

12. The method of claim 8, wherein comparing cost data for the candidate NSP with other ones of the remaining NSPs, comprises comparing a cost for a next cost tier for the candidate NSP with a cost for the next cost tier for the other ones of the remaining NSPs.

* * * * *

UNITED STATES PATENT AND TRADEMARK OFFICE
CERTIFICATE OF CORRECTION

PATENT NO. : 7,668,966 B2  Page 1 of 1
APPLICATION NO. : 10/286576
DATED : February 23, 2010
INVENTOR(S) : Klinker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1784 days.

Signed and Sealed this

Seventh Day of December, 2010

David J. Kappos
*Director of the United States Patent and Trademark Office*